US010386671B2

(12) United States Patent
Koito

(10) Patent No.: US 10,386,671 B2
(45) Date of Patent: Aug. 20, 2019

(54) DISPLAY DEVICE AND ILLUMINATION DEVICE

(71) Applicant: Japan Display Inc., Minato-ku (JP)

(72) Inventor: Takeo Koito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/873,025

(22) Filed: Jan. 17, 2018

(65) Prior Publication Data

US 2018/0239189 A1 Aug. 23, 2018

(30) Foreign Application Priority Data

Feb. 23, 2017 (JP) ................................ 2017-032077

(51) Int. Cl.

*G02F 1/1335* (2006.01)
*G02F 1/1343* (2006.01)
*G02F 1/13* (2006.01)
*G02B 27/22* (2018.01)
*G02F 1/29* (2006.01)

(52) U.S. Cl.

CPC ...... *G02F 1/133526* (2013.01); *G02F 1/1323* (2013.01); *G02F 1/1343* (2013.01); *G02F 1/133512* (2013.01); *G02F 1/133528* (2013.01); *G02B 27/22* (2013.01); *G02F 2001/133607* (2013.01); *G02F 2001/133626* (2013.01); *G02F 2001/294* (2013.01)

(58) Field of Classification Search

CPC ..................................................... G02B 27/22
USPC ........................................................... 349/74
See application file for complete search history.

(56) References Cited

U.S. PATENT DOCUMENTS 5,890,791 A 4/1999 Saito
2012/0154270 A1* 6/2012 Numao .................... H04N 5/72 345/156
2014/0176853 A1* 6/2014 Wang ................ G02F 1/133308 349/58

FOREIGN PATENT DOCUMENTS

JP 09-105804 4/1997
JP 2007-264321 10/2007

* cited by examiner

*Primary Examiner* — Phu Vu
(74) *Attorney, Agent, or Firm* — Oblon, McClelland, Maier & Neustadt, L.L.P.

(57) ABSTRACT

According to one embodiment, a display device includes a display panel and an illumination device. The illumination device includes a light source unit, at least one light-shielding body which blocks part of the light emitted from the light source unit, at least one lens which refracts the light emitted from the light source unit, and an illumination controller. The illumination controller controls a first mode in which the light-shielding body and the lens are arranged at a first position, and a second mode in which at least one of the light-shielding body and the lens is arranged at a second position, which is different from the first position.

14 Claims, 25 Drawing Sheets

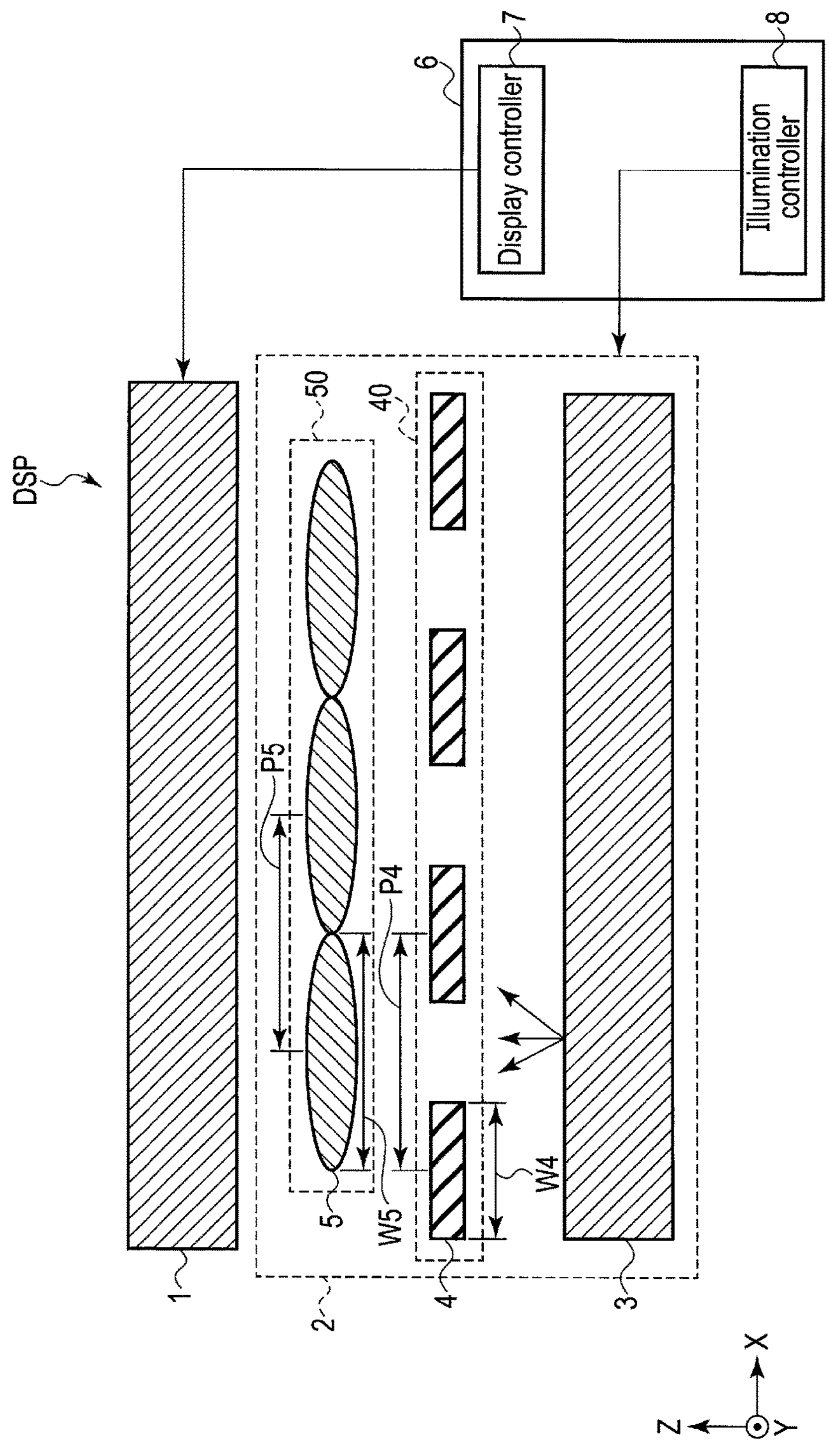
F I G. 1

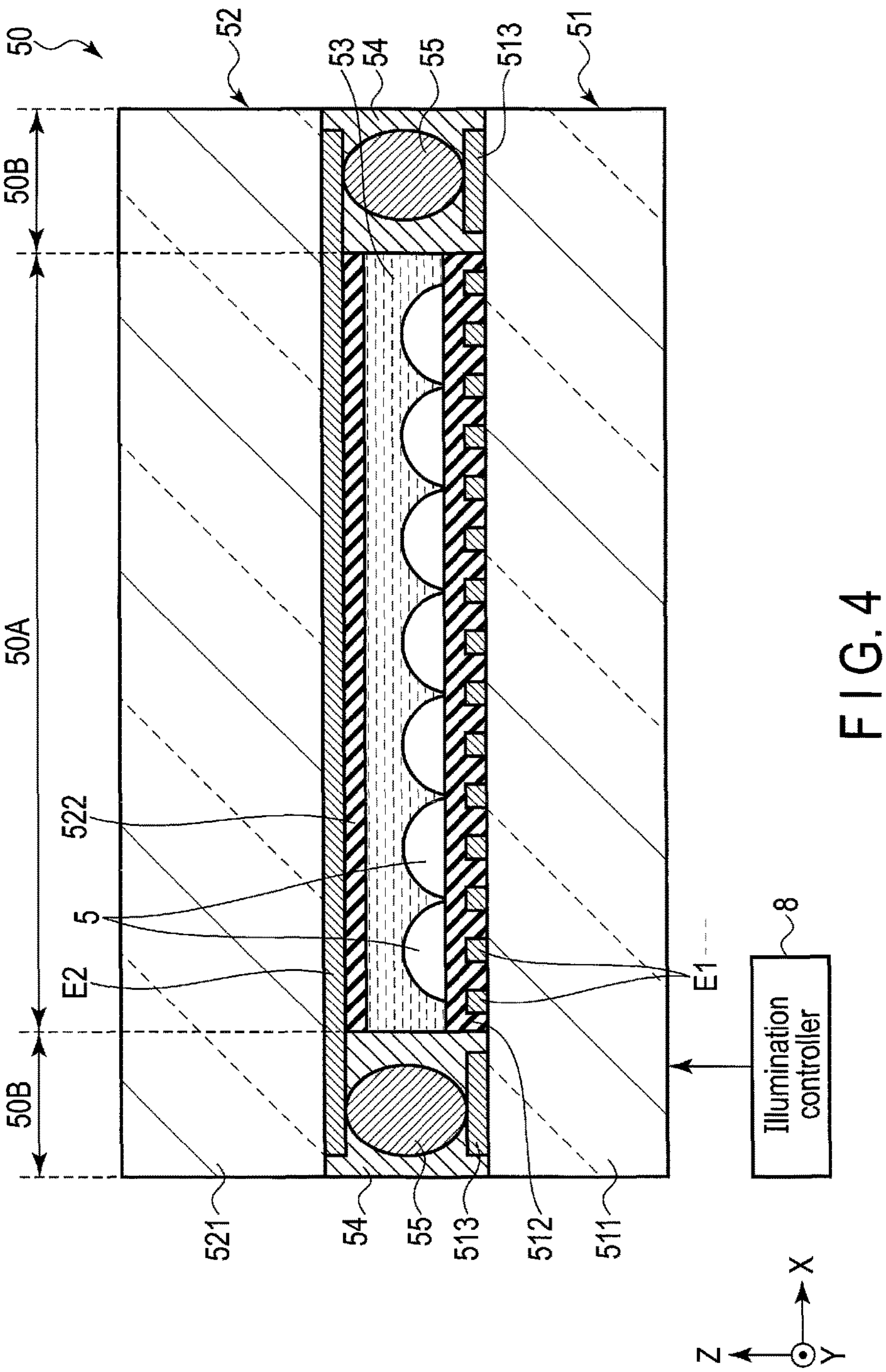
F I G. 4

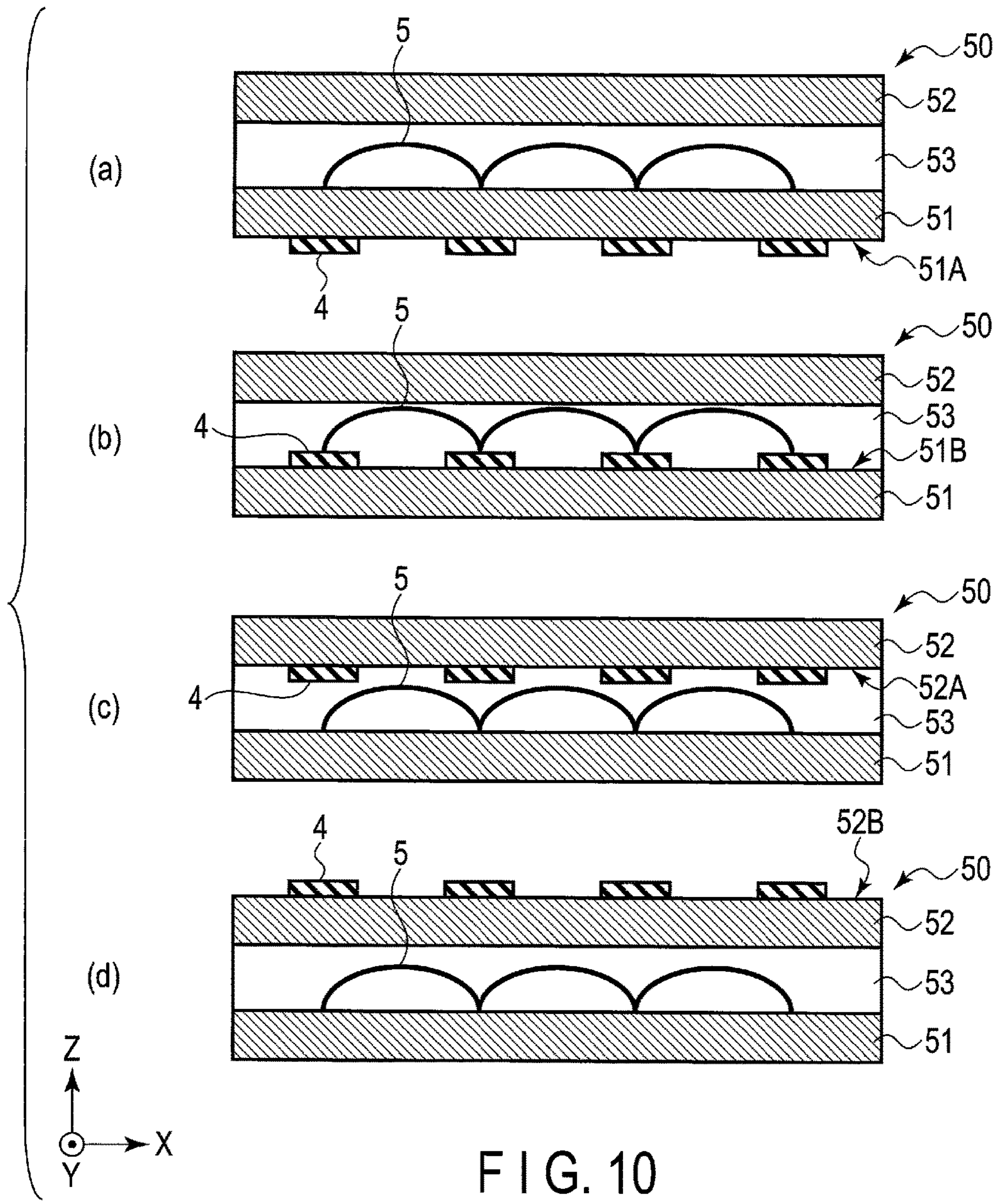
F I G. 10

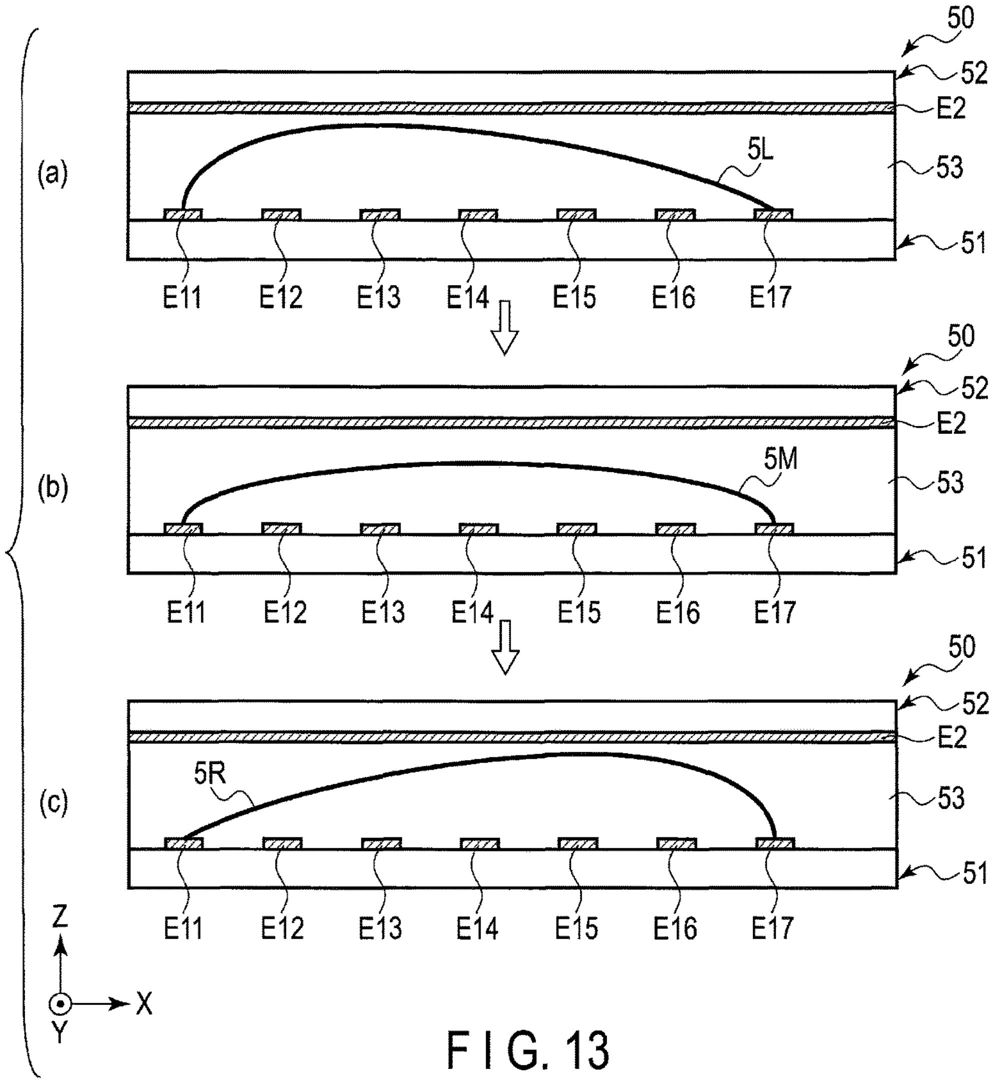
F I G. 13

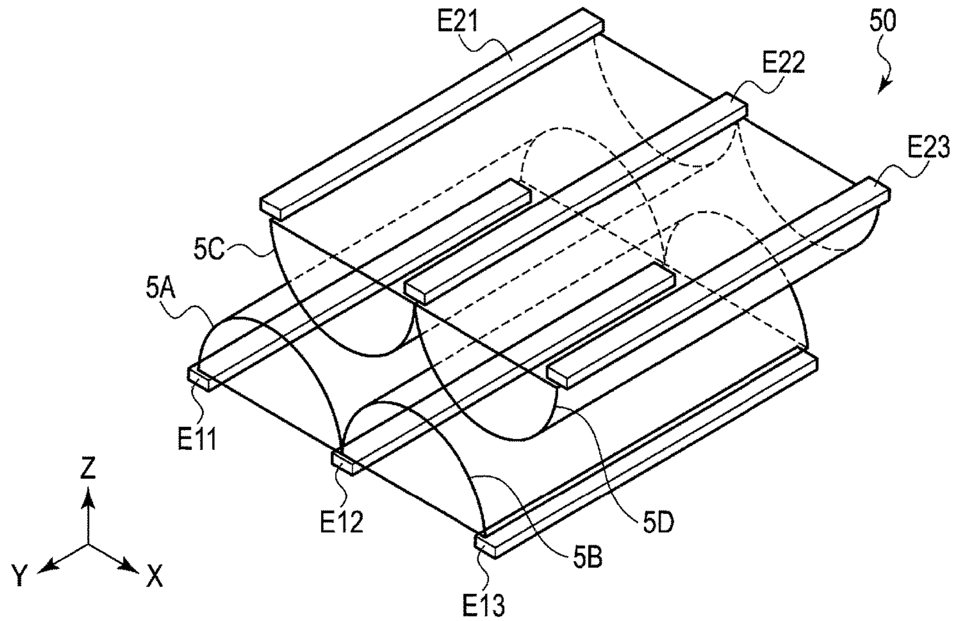
F I G. 14
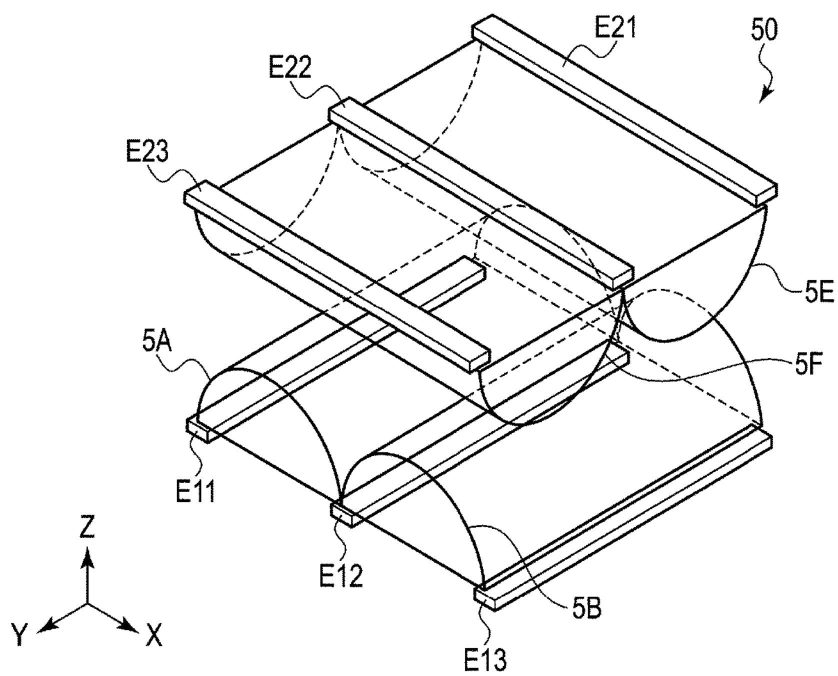
F I G. 15

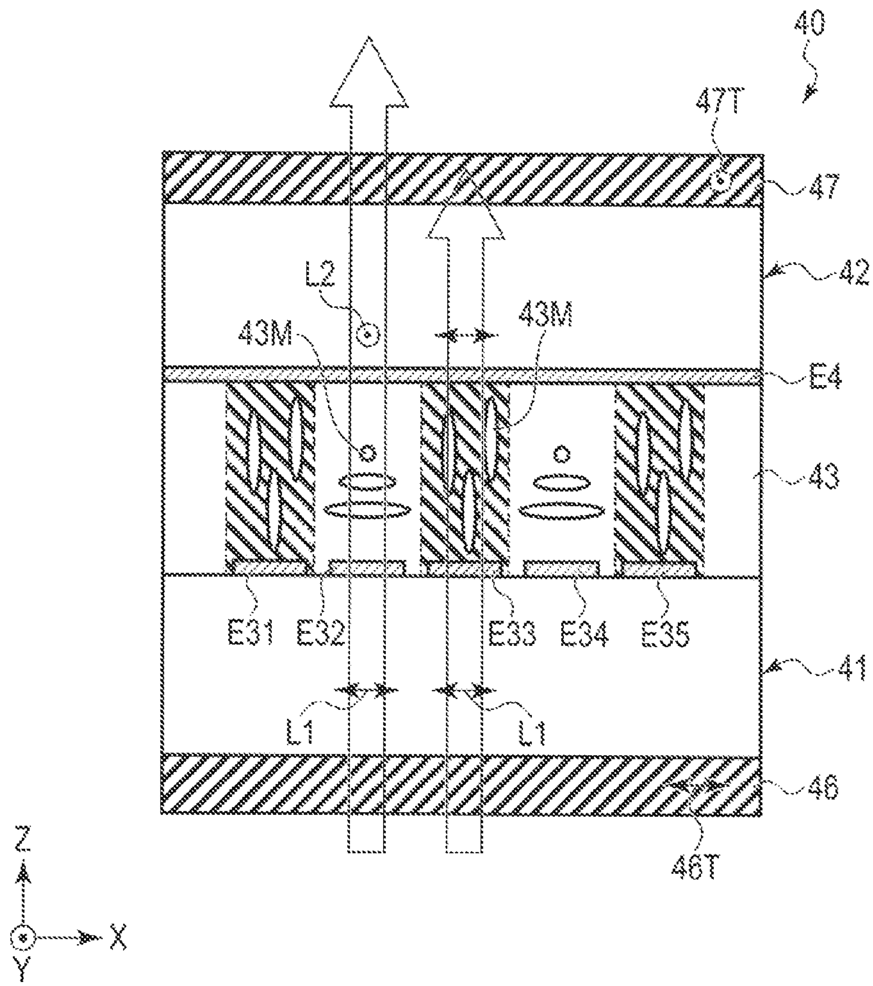
F I G. 17

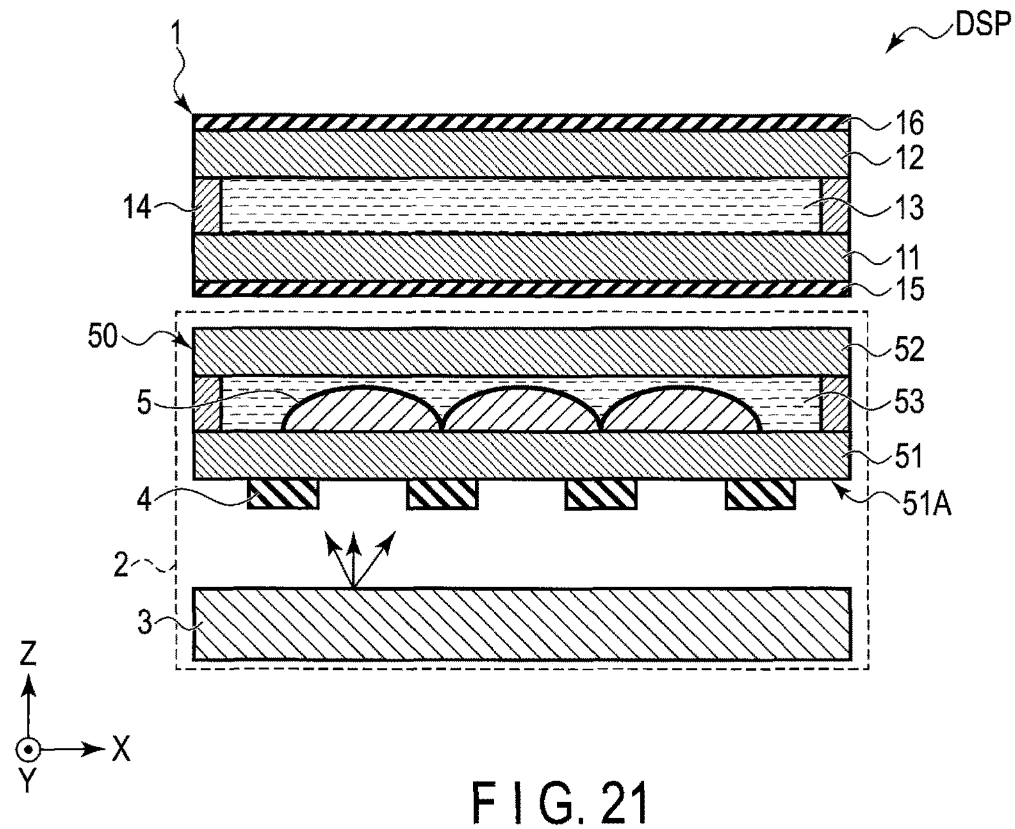
F I G. 21

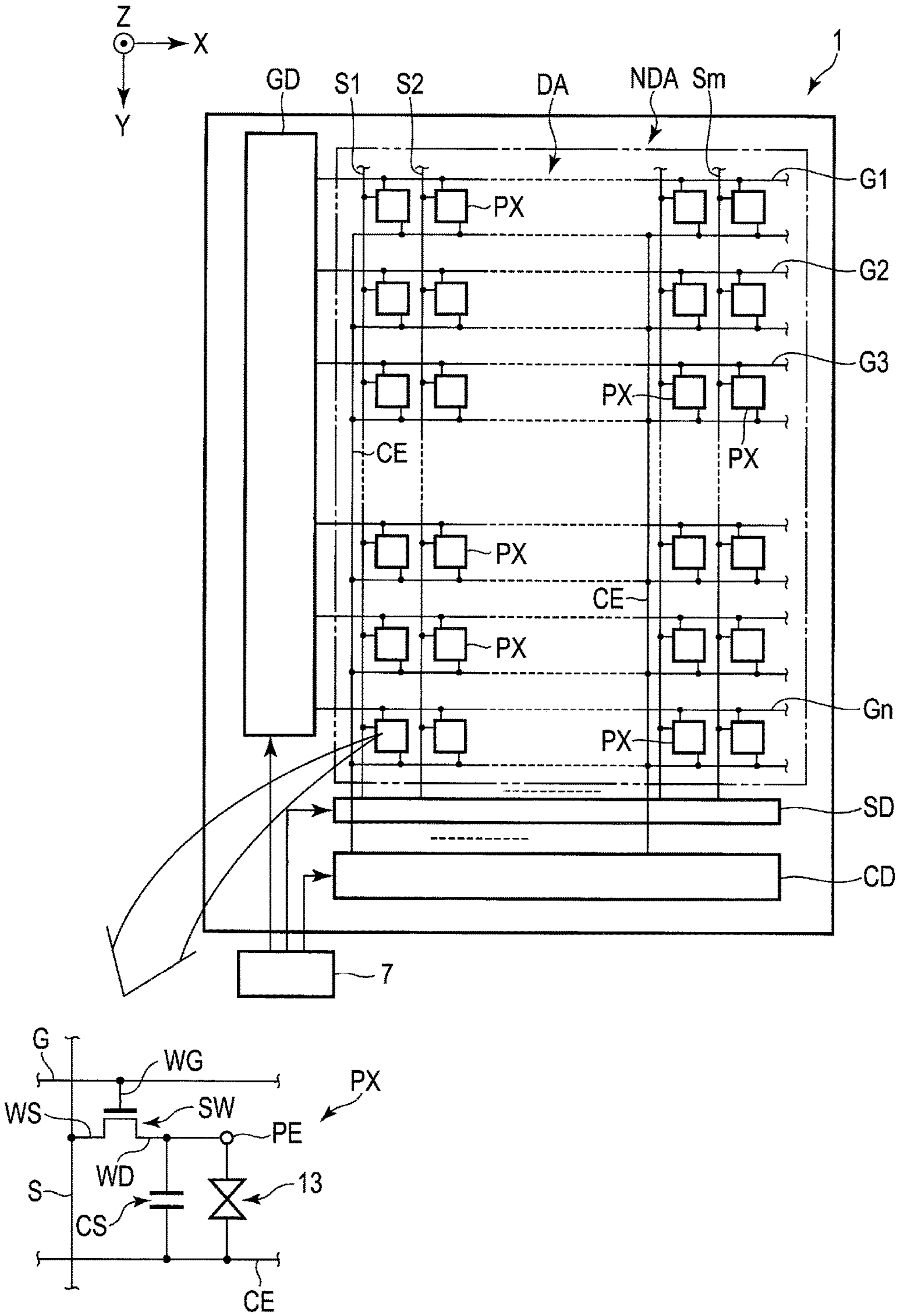
F I G. 22

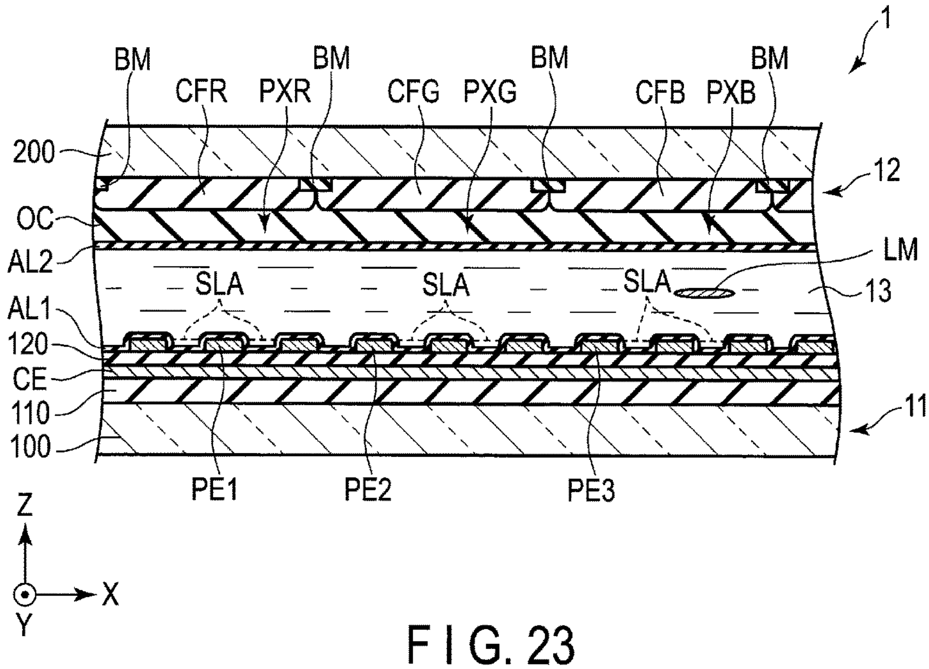
F I G. 23
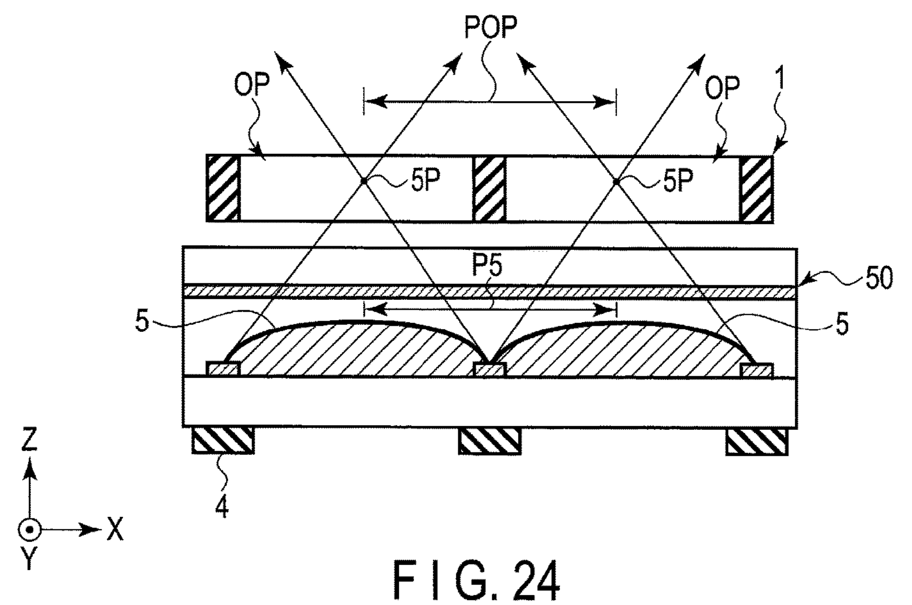
F I G. 24

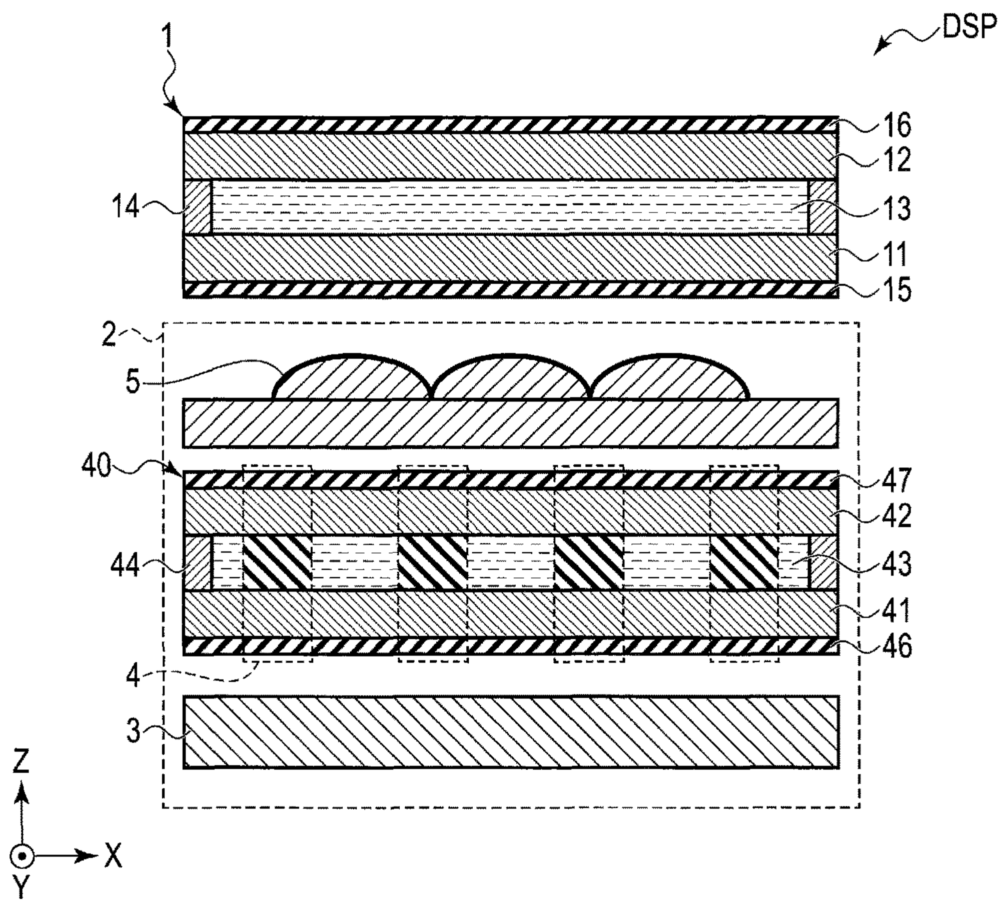
F I G. 25

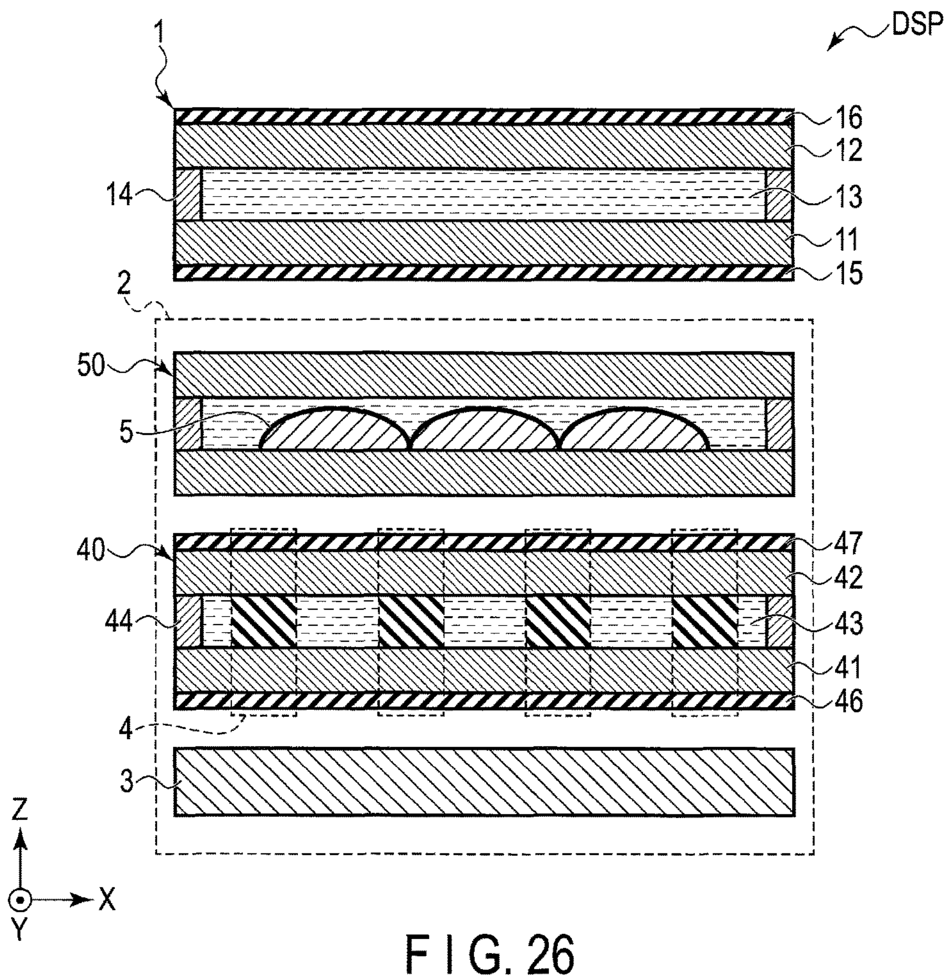
F I G. 26

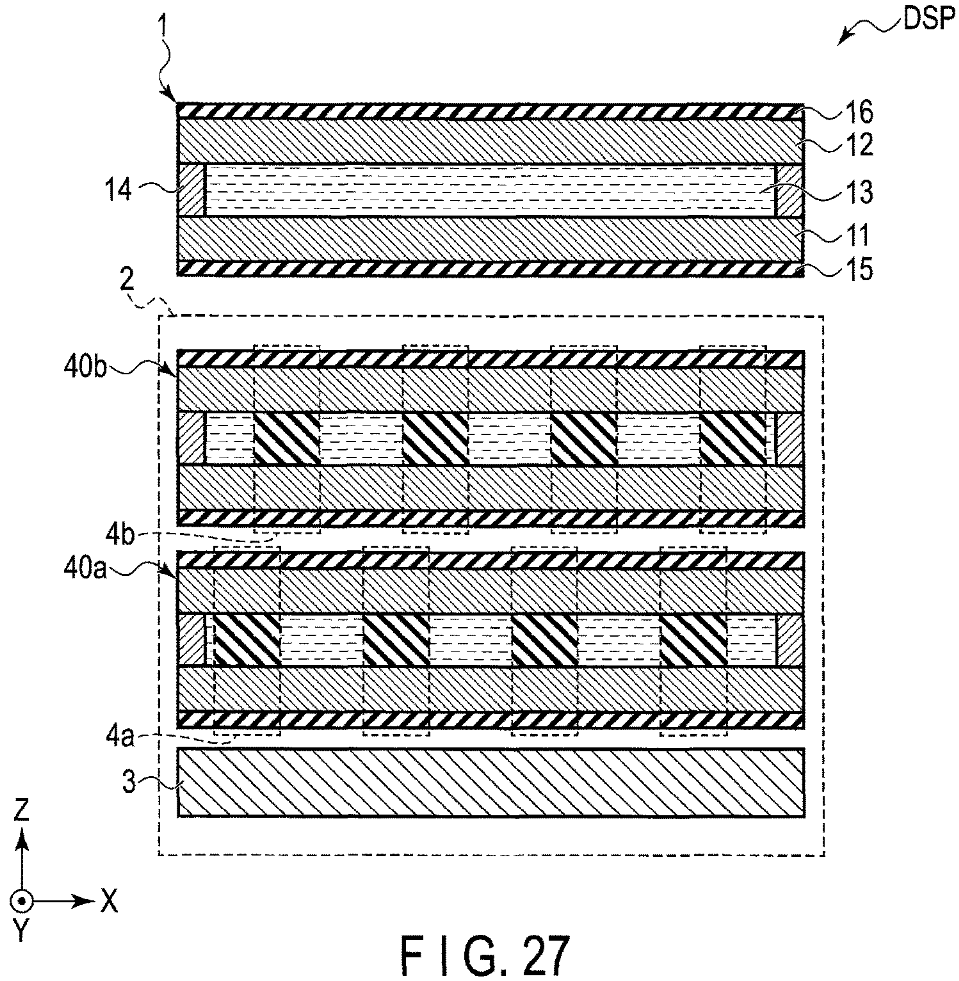
F I G. 27

DISPLAY DEVICE AND ILLUMINATION DEVICE

CROSS-REFERENCE TO RELATED APPLICATIONS

This application is based upon and claims the benefit of priority from Japanese Patent Application No. 2017-032077, filed Feb. 23, 2017, the entire contents of which are incorporated herein by reference.

FIELD

Embodiments described herein relate generally to a display device and an illumination device.

BACKGROUND

For example, a light source device comprising a light control sheet which emits incident light at a predetermined output angle, and a liquid crystal display device including such a light source device have been proposed. The light control sheet includes a plurality of prisms arranged such that their generatrices are parallel to each other. Further, there has been proposed a liquid crystal display panel comprising a diffusion liquid crystal panel which diffuses linearly polarized light, oscillating in a predetermined direction, of light having directivity in a specific direction. The diffusion liquid crystal panel is configured to form a plurality of liquid crystal micro-lens portions by applying a voltage to transparent electrodes arranged with a liquid crystal layer interposed therebetween.

BRIEF DESCRIPTION OF THE DRAWINGS

FIG. 1 is an illustration showing a configuration example of a display device DSP of the present embodiment.

FIG. 4 is a cross-sectional view showing a configuration example of a liquid crystal element 50.

FIG. 10 is an illustration showing an example of arrangement of the light-shielding bodies 4.

FIG. 13 is an illustration for explaining a formation example of lenses 5L and 5R shown in FIG. 12.

FIG. 14 is an illustration showing a third variation of the liquid crystal element 50.

FIG. 15 is an illustration showing a fourth variation of the liquid crystal element 50.

FIG. 17 is an illustration for explaining the light-shielding body 4 formed in the liquid crystal element 40.

FIG. 21 is an illustration showing a first example of the display device DSP.

FIG. 22 is an illustration showing a basic structure and an equivalent circuit of a display panel 1 shown in FIG. 21.

FIG. 23 is a cross-sectional view showing a configuration example of the display panel 1 shown in FIG. 22.

FIG. 24 is an illustration for explaining an example of a positional relationship between a pixel opening OP of the display panel 1 and the lens 5.

FIG. 25 is an illustration showing a second example of the display device DSP.

FIG. 26 is an illustration showing a third example of the display device DSP.

FIG. 27 is an illustration showing a fourth example of the display device DSP.

DETAILED DESCRIPTION

Figure 2:
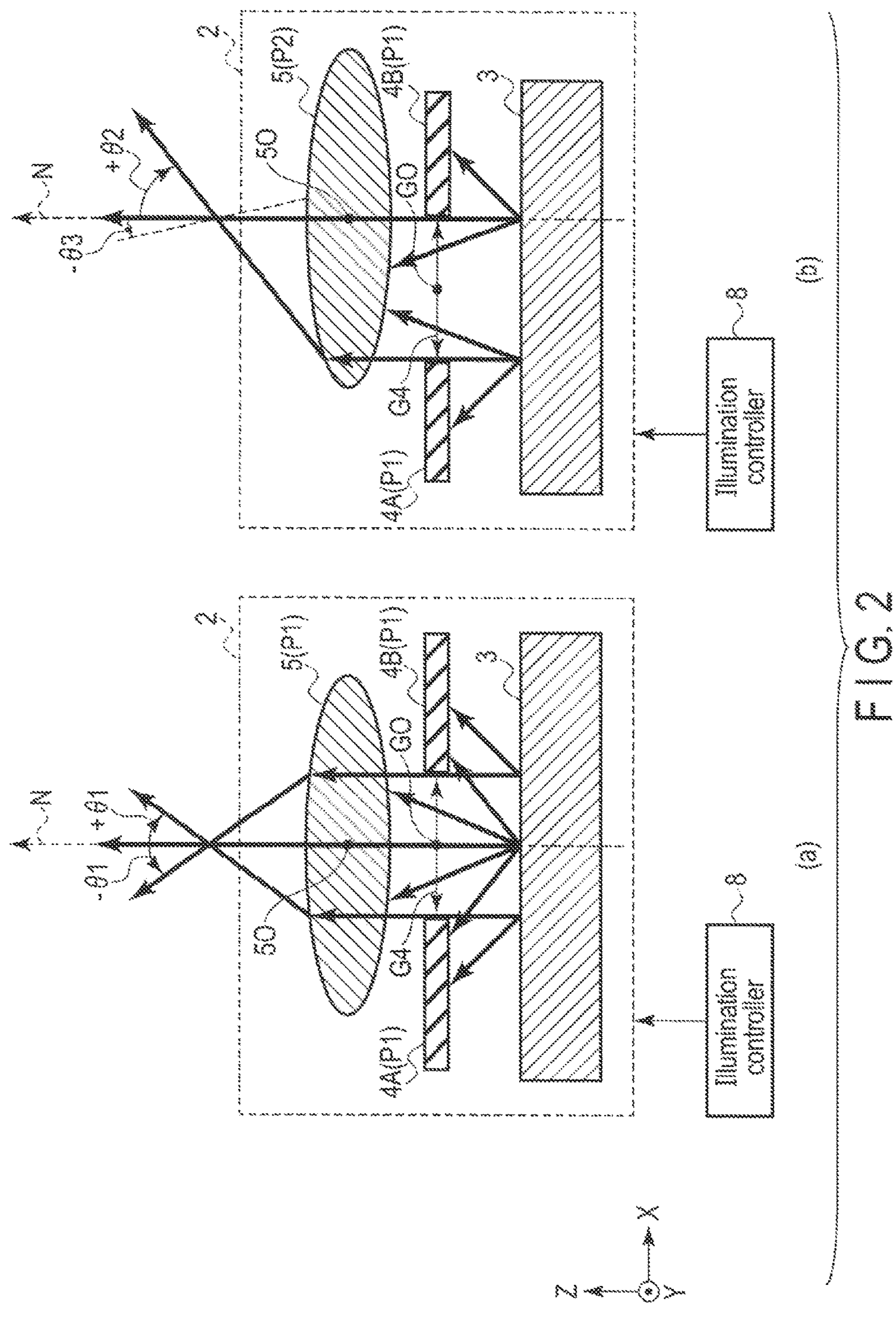
FIG. 2 is illustration for explaining an example of control by an illumination controller 8.

In general, according to one embodiment, a display device includes: a display panel; and an illumination device which illuminates the display panel, the illumination device including a light source unit which emits light toward the display panel, at least one light-shielding body which is located between the light source unit and the display panel, and blocks part of the light emitted from the light source unit, at least one lens which is located between the light source unit and the display panel, and refracts the light emitted from the light source unit, and an illumination controller, the illumination controller controlling a first mode in which the light-shielding body and the lens are arranged at a first position, and a second mode in which at least one of the light-shielding body and the lens is arranged at a second position, which is different from the first position.

According to another embodiment, an illumination device includes: a light source unit which emits light; a light-shielding body which blocks part of the light emitted from the light source unit; a lens which refracts the light emitted from the light source unit; and an illumination controller which controls a first mode in which the light-shielding body and the lens are arranged at a first position, and a second mode in which at least one of the light-shielding body and the lens is arranged at a second position, which is different from the first position.

According to yet another embodiment, an illumination device includes: a light source unit which emits light; a first light control body which controls an output angle of light emitted from the light source unit; a second light control body which controls an output angle of the light controlled by the first light control body; and an illumination controller which controls a first mode in which the first light control body and the second light control body are arranged at a first position, and a second mode in which at least one of the first light control body and the second light control body is arranged at a second position, which is different from the first position.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and redundant detailed description thereof is omitted unless necessary.

FIG. 1 is an illustration showing a configuration example of a display device DSP of the present embodiment. While a first direction X, a second direction Y, and a third direction Z in the drawing are orthogonal to each other, they may cross each other at an angle other than 90 degrees. The third direction Z corresponds to a direction of arrangement of optical elements which constitute the display device DSP.

The display device DSP comprises a display panel 1 and an illumination device 2 which illuminates the display panel 1. Although the details of the display panel 1 will be described later, in one example, the display panel 1 is a liquid crystal display panel.

The illumination device 2 comprises a light source unit 3, a light-shielding body 4, a lens 5, and a controller 6. The light source unit 3 emits light toward the display panel 1. Although the details of the light source unit 3 will not be described here, the light source unit 3 may be, for example, an edge-light-type device comprising a plate-like light-guide arranged directly under the display panel 1 and a light source arranged along an edge of the light-guide, or may be a direct-type device comprising a light source arranged directly under the display panel 1. Light emitted from the light source unit 3 does not necessarily have directivity in a particular direction. In the example illustrated, the light emitted from the light source unit 3 has diverging properties as shown by a plurality of arrows in the drawing.

The light-shielding body 4 and the lens 5 are located between the light source unit 3 and the display panel 1. In the example illustrated, while the light-shielding body 4 is located between the light source unit 3 and the lens 5, it may be located between the lens 5 and the display panel 1. The light-shielding body 4 blocks part of the light emitted from the light source unit 3. A plurality of light-shielding bodies 4 are arranged at intervals in the first direction X, for example. Each of the light-shielding body 4 has width W4 in the first direction X, and extends in the second direction Y. The lens 5 refracts light emitted from the light source unit 3. A plurality of lenses 5 are arranged at intervals in the first direction X, for example. Each of the lenses 5 has width W5 in the first direction X, and extends in the second direction Y. A direction in which the light-shielding bodies 4 are arranged is the same as a direction in which the lenses 5 are arranged. Pitch P4 between the light-shielding bodies 4 is less than or equal to pitch P5 between the lenses 5. The light-shielding body 4 and the lens 5 are both an example of a light control body which controls an output angle of light. Note that the light-shielding body 4 may be fixed to a predetermined position, or may be provided in a liquid crystal element 40 which will be described in detail later. Also, the lens 5 may be fixed to a predetermined position, or may be provided in a liquid crystal element 50 which will be described in detail later.

The controller 6 comprises a display controller 7 and an illumination controller 8. The display controller 7 controls the display panel 1. The illumination controller 8 controls the illumination device 2.

FIG. 2 is an illustration for explaining an example of control by the illumination controller 8. FIG. 2(*a*) is an illustration for explaining a first mode which is controlled by the illumination controller 8, and FIG. 2(*b*) is an illustration for explaining a second mode which is controlled by the illumination controller 8.

In the first mode shown in FIG. 2(*a*), each of light-shielding bodies 4A and 4B, and the lens 5 is arranged at a first position P1. In the example illustrated, the light-shielding bodies 4A and 4B are arranged in the first direction X with a gap G4 therebetween. The lens 5 is arranged such that a center 50 of the lens 5 and a center GO of the gap G4 are positioned on a normal N of the light source unit 3.

In such a first mode, of the light emitted from the light source unit 3, while emitted light traveling in a direction parallel to the normal N and emitted light traveling in a direction slightly inclined with respect to the normal N pass through the gap G4, emitted light traveling in a direction greatly inclined with respect to the normal N is blocked by the light-shielding bodies 4A and 4B. In other words, the light-shielding bodies 4A and 4B allow only the light emitted in a direction close to a direction along the normal N to be passed through, of the divergent light. The lens 5 refracts the light which has passed through the gap G4. An emitting direction of light emitted from the illumination device 2 in the first mode falls within a range that is symmetrical with respect to the normal N. When a range of the emitting direction is assumed as a range of ±θ1 with respect to the normal N, θ1 is 30° in one example. Here, it is assumed that an angle formed by an inclination to the right in the drawing with respect to the normal N is positive (+), and an angle formed by an inclination to the left in the drawing with respect to the normal N is negative (−). In this first mode, when the illumination device 2 is observed in a direction opposite to a direction indicated by an arrow representing the third direction Z, the emitted light can be observed over an angular range that is symmetrical about the normal N. In one example, by reducing a width of the gap G4 along the first direction X (or making the pitch between the light-shielding bodies 4A and 4B smaller than the pitch between the lenses 5), a range of the emitting direction can be set to a smaller range of angle.

In the second mode shown in FIG. 2(*b*), while the light-shielding bodies 4A and 4B are arranged at the first position P1, the lens 5 is arranged at a second position P2. The second position in this mode is a position shifted to the right in the drawing along the first direction X as compared to the first position P1 shown in FIG. 2(*a*). Alternatively, in the second mode, the light-shielding bodies 4A and 4B may be arranged at the second position P2 while the lens 5 is arranged at the first position P1, or the light-shielding bodies 4A and 4B and the lens 5 may all be arranged at the second position different from the first position P1. As in the first mode, the light-shielding bodies 4A and 4B are arranged in the first direction X with the gap G4 therebetween. The lens 5 is arranged such that the center 50 of the lens 5 is displaced from the center GO of the gap G4.

In such a second mode, the light-shielding bodies 4A and 4B allow only the light emitted in a direction close to the direction along the normal N to be passed through, as in the case of the first mode. The lens 5 refracts the light which has passed through the gap 04. An emitting direction of light emitted from the illumination device 2 in the second mode falls within a range that is unsymmetrical with respect to the normal N. When a range of the emitting direction is assumed as a range of +θ2 and −θ3 with respect to the normal N, θ2 is greater than θ3. In one example, θ2 is 60° and θ3 is 0°. In such a second mode, when the illumination device 2 is observed, the emitted light can be observed over an angular range that is unsymmetrical about the normal N in the first direction X. As described above, by changing a relative positional relationship between a place where the light-shielding bodies 4A and 4B are provided or the gap G4 and the lens 5 along the first direction X, an angular range of the emitting direction can be controlled within an X-Z plane defined by the first direction X and the third direction Z.

Figure 3:
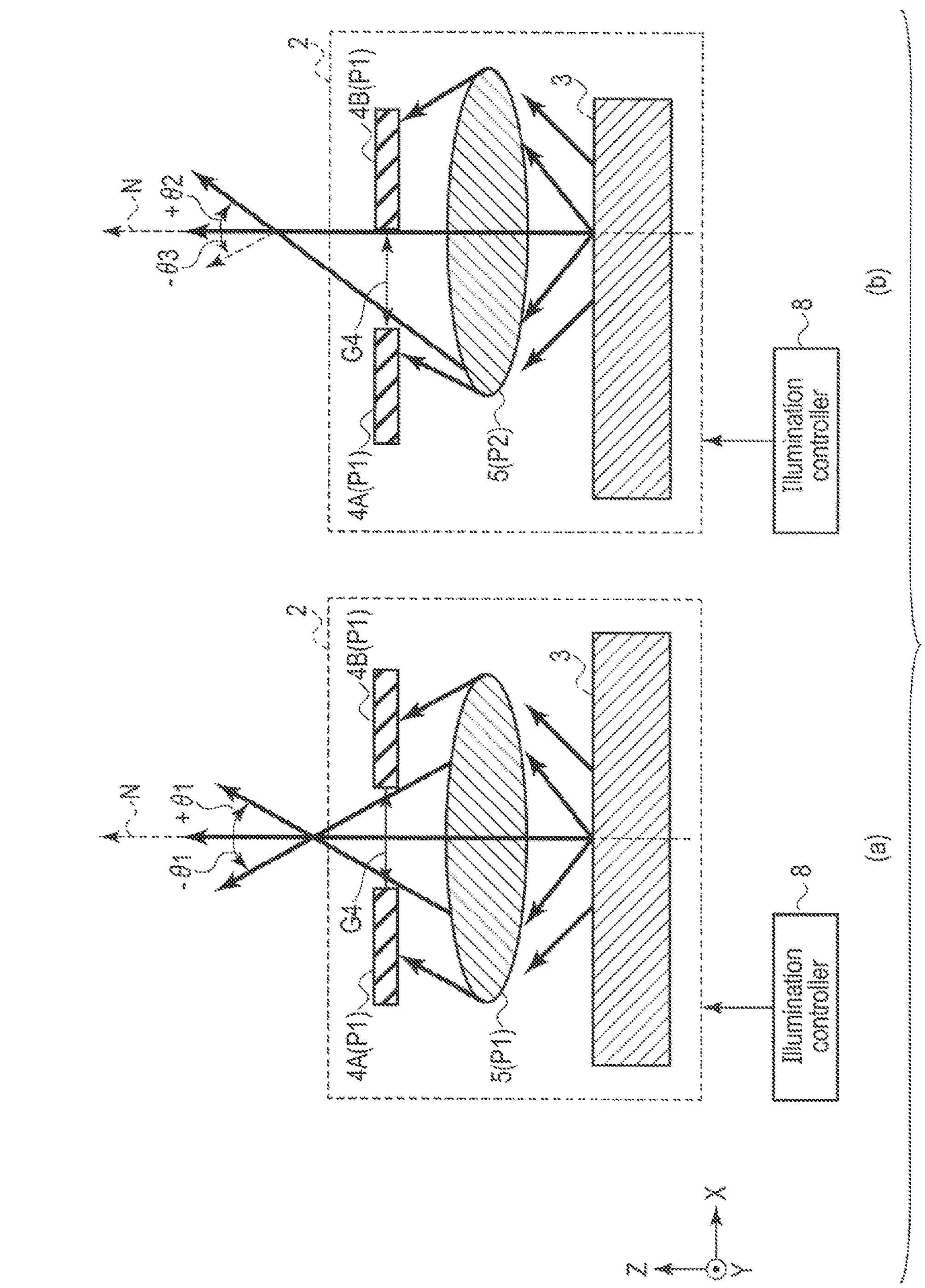
FIG. 3 is an illustration for explaining an example of control in another configuration example of an illumination device 2.

FIG. 3 is an illustration for explaining an example of control in another configuration example of the illumination device 2. FIG. 3(*a*) is an illustration for explaining a first mode, and FIG. 3(*b*) is an illustration for explaining a second mode. Another configuration example shown in FIG. 3 is different from the configuration example illustrated in FIG. 2 in that the lens 5 is located between the light source unit 3 and the light-shielding bodies 4A and 4B.

In the first mode shown in FIG. 3(*a*), each of the light-shielding bodies 4A and 4B, and the lens 5 is arranged at the first position P1. The emitted light from the light source unit 3 is refracted by the lens 5. Of the light refracted by the lens 5, part of the light is blocked by the light-shielding bodies 4A and 4B. An emitting direction of light emitted from the illumination device 2 in the first mode falls within a range that is symmetrical with respect to the normal N.

In the second mode shown in FIG. 3(*b*), while the light-shielding bodies 4A and 4B are arranged at the first position P1, the lens 5 is arranged at the second position P2. Note that in the second mode, it suffices that at least either of the light-shielding body and the lens, i.e., the light-shielding bodies 4A and 4B and the lens 5, is arranged at the second position different from the first position P1. In the second mode, the emitted light from the light source unit 3 is refracted by the lens 5, and part of the refracted light is blocked by the light-shielding bodies 4A and 4B. An emitting direction of light emitted from the illumination device 2 in the second mode falls within a range that is unsymmetrical with respect to the normal N.

According to the present embodiment, by changing a relative positional relationship between a place where the light-shielding bodies 4A and 4B are provided or the gap G4 and the lens 5, the emitting direction of light emitted from the light source unit 3 can be controlled. Also, even if the light emitted from the light source unit 3 is greatly divergent, the emitting direction can be narrowed to a predetermined angular range, and directivity can be given to light.

Next, the liquid crystal element 50 comprising the lens 5 will be described. The liquid crystal element 50 corresponds to a first liquid crystal element.

FIG. 4 is a cross-sectional view showing a configuration example of the liquid crystal element 50.

The liquid crystal element 50 comprises a first substrate 51, a second substrate 52, a first liquid crystal layer 53, a first control electrode E1, and a second control electrode E2. In the example illustrated, the first control electrode E1 is provided on the first substrate 51, and the second control electrode E2 is provided on the second substrate 52. However, the first control electrode E1 and the second control electrode E2 may both be provided on the same substrate, that is, on the first substrate 51 or the second substrate 52.

The first substrate 51 comprises an insulating substrate 511, a plurality of first control electrodes E1, an alignment film 512, and a feeder 513. The first control electrode E1 is located between the insulating substrate 511 and the first liquid crystal layer 53. The first control electrodes E1 are arranged at intervals in the first direction X in an effective area 50A. In one example, a width of each of the first control electrodes E1 along the first direction X is less than or equal to an interval between adjacent first control electrodes E1 along the first direction X. The alignment film 512 covers the first control electrodes E1, and is in contact with the first liquid crystal layer 53. The feeder 513 is located in a non-effective area 50B outside the effective area 50A.

The second substrate 52 comprises an insulating substrate 521, the second control electrode E2, and an alignment film 522. The second control electrode E2 is located between the insulating substrate 521 and the first liquid crystal layer 53. The second control electrode E2 is, for example, a single plate electrode which is located on substantially the entire surface of the effective area 50A, and also extends to the non-effective area 50B. The second control electrode E2 is opposed to the first control electrode E1 via the first liquid crystal layer 53 in the effective area 50A. The second control electrode E2 is opposed to the feeder 513 in the non-effective area 50B. The alignment film 522 covers the second control electrode E2, and is in contact with the first liquid crystal layer 53.

Each of the insulating substrates 511 and 521 is, for example, a glass substrate or a resin substrate. Each of the first control electrode E1 and the second control electrode E2 is formed of a transparent conductive material such as indium tin oxide (ITO) or indium zinc oxide (IZO). Each of the alignment films 512 and 522 is, for example, a horizontal alignment film, and is subjected to alignment treatment in the first direction X.

The first substrate 51 and the second substrate 52 are bonded to each other by a sealant 54 in the non-effective area 50B. The sealant 54 includes a conductive material 55. The conductive material 55 is interposed between the feeder 513 and the second control electrode E2, and electrically connects the feeder 513 and the second control electrode E2.

The first liquid crystal layer 53 is held between the first substrate 51 and the second substrate 52. The first liquid crystal layer 53 is formed of, for example, a liquid crystal material having positive dielectric anisotropy. The first control electrode E1 and the second control electrode E2 apply, to the first liquid crystal layer 53, a voltage for forming the lens 5 in the first liquid crystal layer 53.

The illumination controller 8 controls the voltage to be applied to the first liquid crystal layer 53. By controlling the voltage to be applied to each of the first control electrode E1 and the second control electrode E2, the illumination controller 8 can switch a mode between a mode in which the lens 5 is formed in the first liquid crystal layer 53 and a mode in which a lens is not formed in the first liquid crystal layer 53. Further, by controlling the voltage to be applied to each of the first control electrodes E1, the illumination controller 8 can control a position where the lens 5 is formed. More specifically, the illumination controller 8 can form the lens 5 at each of the first position P1 and the second position P2, as has been explained with reference to FIGS. 2 and 3. Furthermore, by controlling the voltage to be applied to each of the first control electrodes E1, the illumination controller 8 can control the size and the shape of the lens 5 freely.

Figure 5:
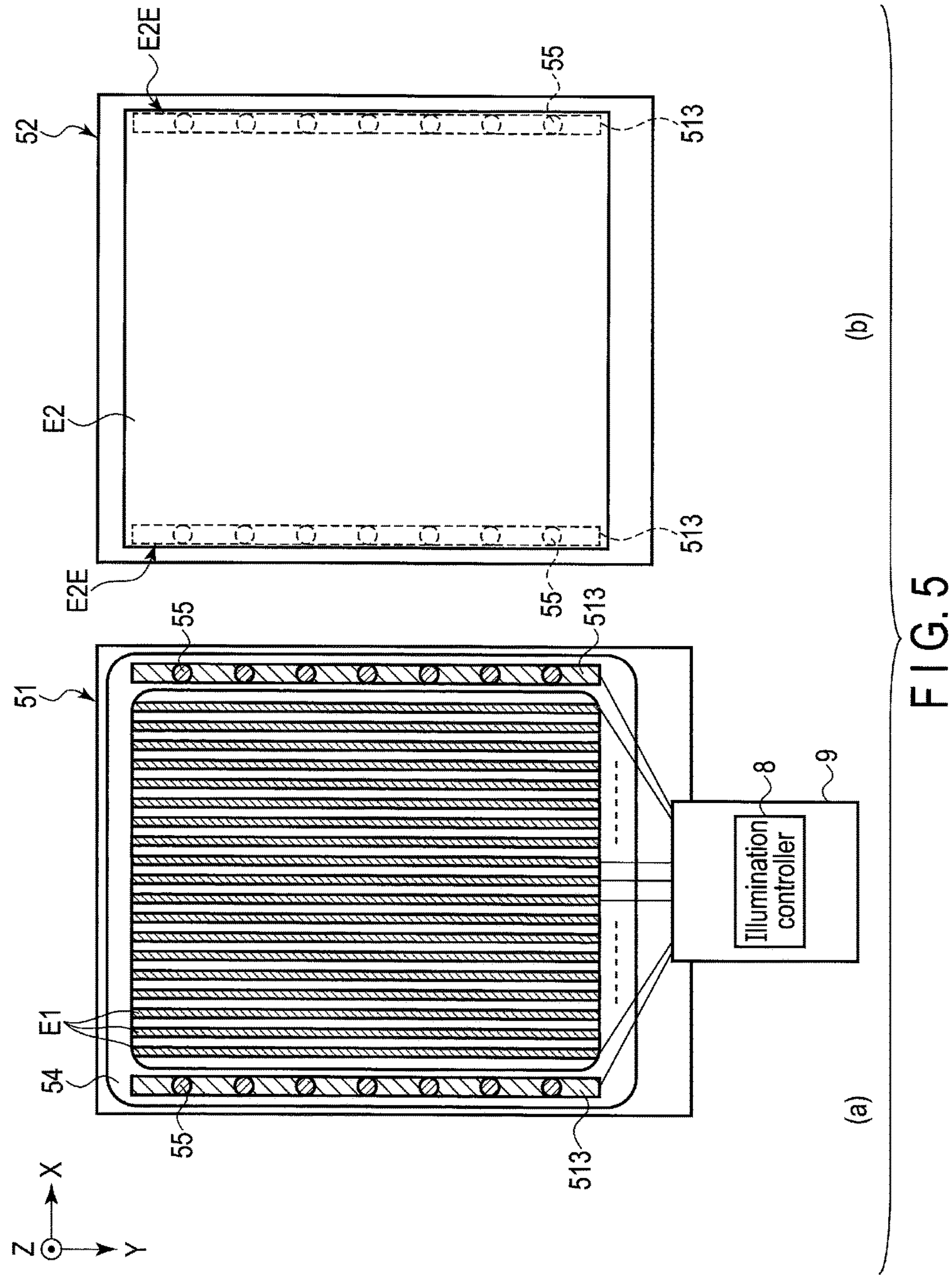
FIG. 5 is a plan view showing a configuration example of the liquid crystal element 50.

FIG. 5 is a plan view showing a configuration example of the liquid crystal element 50. FIG. 5(*a*) is a plan view of the first substrate 51, and FIG. 5(*b*) is a plan view of the second substrate 52.

In the first substrate 51 shown in FIG. 5(*a*), the sealant 54 is formed in a frame shape. The first control electrodes E1 are located at an inner side surrounded by the sealant 54, and are arranged at intervals in the first direction X. Each of the first control electrodes E1 is, for example, a strip electrode extending in the second direction Y. Alternatively, the first control electrodes E1 may each be a strip electrode extending in the first direction X, or may be island-shaped electrodes arranged in the first direction X and the second direction Y. The shape of the island-shaped electrode is polygonal, such as rectangular or hexagonal, or circular. The feeder 513 extends in the second direction Y at a position overlapping the sealant 54. At least a part of the conductive material 55 included in the sealant 54 overlaps the feeder 513. A wiring substrate 9 is connected to the first substrate 51, and electrically connects each of the first control electrodes E1 and the feeder 513 with the illumination controller 8.

In the second substrate 52 shown in FIG. 5(*b*), the second control electrode E2 is formed rectangular, and includes an end portion E2E extending in the second direction Y. The end portion E2E overlaps the feeder 513 and the conductive material 55. That is, the second control electrode E2 is electrically connected to the illumination controller 8 via the conductive material 55 and the feeder 513.

Figure 6:
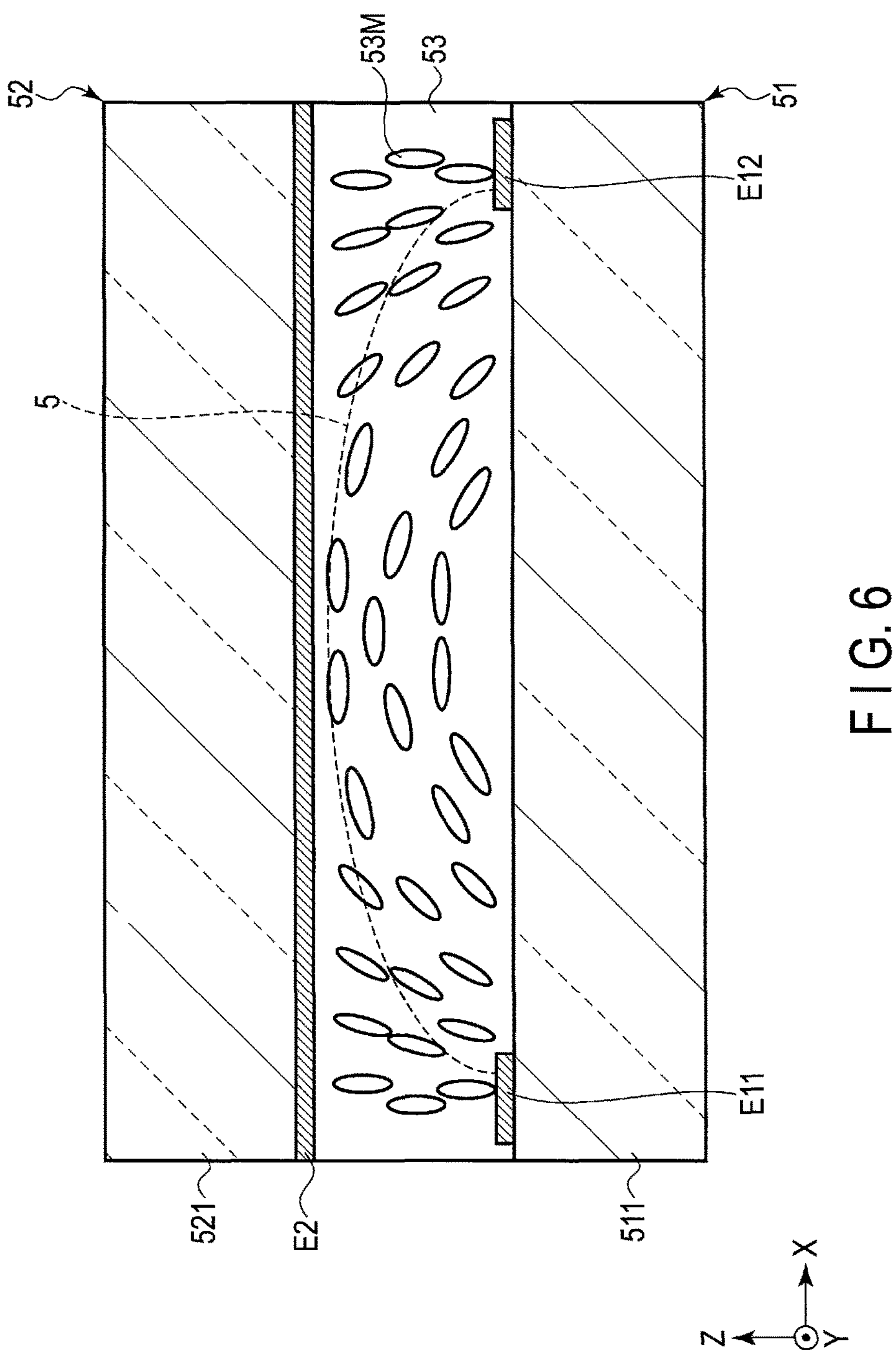
FIG. 6 is an illustration for explaining a lens 5 formed in a first liquid crystal layer 53.

FIG. 6 is an illustration for explaining the lens 5 formed in the first liquid crystal layer 53. FIG. 6 illustrates only the structures necessary for explanation. Here, a case of applying a voltage, which is different from that applied to first control electrode E11 and E12, to the second control electrode E2 will be described.

In one example, as described above, the first liquid crystal layer 53 has positive dielectric anisotropy. Liquid crystal molecules 53M included in the first liquid crystal layer 53 are initially aligned such that their major axes are aligned in the first direction X in a state where an electric field is not formed, and are aligned such that the major axes of the liquid crystal molecules 53M are aligned along an electric field in a state where the electric field is formed.

In one example, a voltage of 6V is applied to the first control electrode E11, a voltage of −6V is applied to the first control electrode E12, and a voltage of 0V is applied to the second control electrode E2. In regions in which the first control electrodes E11 and E12 are opposed to the second control electrode E2, an electric field along the third direction Z is formed. Therefore, the liquid crystal molecules 53M are aligned such that their major axes are aligned along the third direction Z. In a region between the first control electrode E11 and the first control electrode E12, an electric field which is tilted with respect to the third direction Z is formed. Therefore, the liquid crystal molecules 53M are aligned such that their major axes are tilted with respect to the third direction Z. In an intermediate region, which is a region intermediate between the first control electrode E11 and the first control electrode E12, an electric field is hardly formed or an electric field along the first direction X is formed. Therefore, the liquid crystal molecules 53M are aligned such that their major axes are aligned along the first direction X. The liquid crystal molecule 53M has refractive anisotropy Δn. Accordingly, the liquid crystal layer 53 has a refractive-index distribution according to an alignment state of the liquid crystal molecules 53M. In other words, the liquid crystal layer 53 has a retardation distribution or a phase distribution which is represented by Δn·d, where d is a thickness of the first liquid crystal layer 53 along the third direction Z. Thickness d is, for example, 10 to 100 μm. The lens 5 shown by a dotted line in the drawing is one that is formed by the refractive-index distribution, retardation distribution, or phase distribution described above. The illustrated lens 5 functions as a convex lens.

In the present embodiment, a system formed by combining the first liquid crystal layer 53 including liquid crystal molecules which are initially aligned substantially horizontally along a substrate main surface and an electric field formed along a direction intersecting the substrate main surface has been explained, as an example of the liquid crystal element 50 comprising the lens 5. However, the liquid crystal element 50 comprising the lens 5 is not limited to the above. For example, a liquid crystal layer including liquid crystal molecules which are initially aligned substantially perpendicularly to the substrate main surface may be combined, or the first liquid crystal layer 53 may be combined with an electric field formed along the substrate main surface. In other words, as long as the system can vary the refractive-index distribution according to an electric field applied to the liquid crystal layer, a liquid crystal element comprising the lens 5 can be realized. The substrate main surface mentioned above refers to an X-Y plane defined by the first direction X and the second direction Y.

Figure 7:
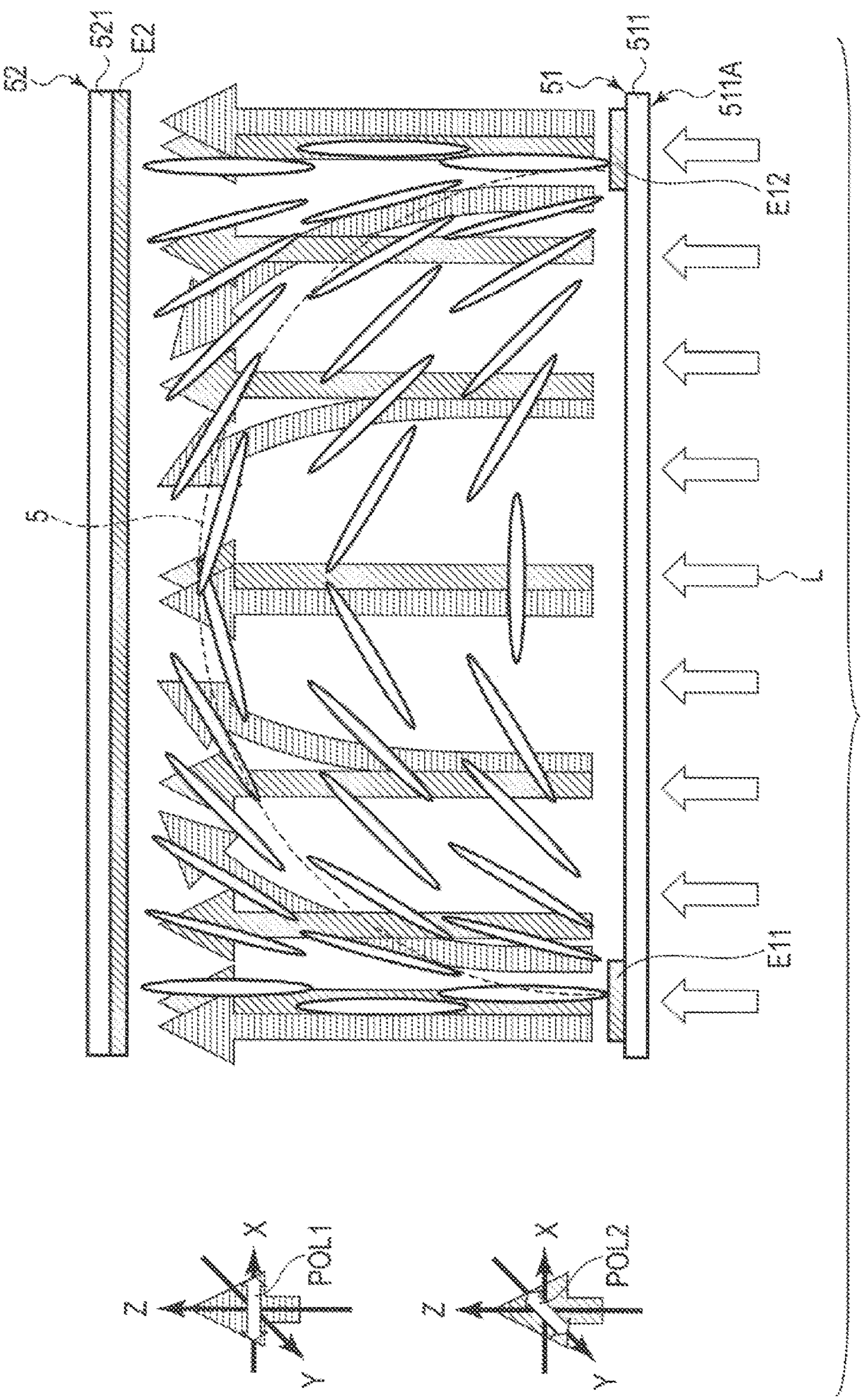
FIG. 7 is an illustration for explaining the function of the lens 5 illustrated in FIG. 6.

FIG. 7 is an illustration for explaining the function of the lens 5 illustrated in FIG. 6.

Here, when a traveling direction of light is along the third direction Z, linearly polarized light having an oscillation plane along the first direction X is referred to as first polarized light POL1, and linearly polarized light having an oscillation plane along the second direction Y is referred to as second polarized light POL2. The first polarized light POL1 is shown by an arrow of horizontal stripes in the drawing, and the second polarized light POL2 is shown by an arrow of slanting stripes in the drawing. Light L is, for example, natural light having random oscillation planes, and is assumed to enter from an outer surface 511A of the insulating substrate 511, and travel from the first substrate 51 toward the second substrate 52.

The lens 5 has different functions on the first polarized light POL1 and the second polarized light POL2, respectively. That is, of the natural light L, the lens 5 transmits the second polarized light POL2 without practically refracting the second polarized light POL2, and refracts the first polarized light POL1. In other words, the lens 5 exhibits a focusing function on mainly the first polarized light POLL FIG. 8 is an illustration for explaining a formation example of the lens 5 provided in the liquid crystal element 50.

The first substrate 51 comprises first control electrodes E11 to E19 arranged at substantially regular intervals in the first direction X. The second control electrode E2 is opposed to the first control electrodes E11 to E19 with the first liquid crystal layer 53 interposed therebetween.

Figure 8:
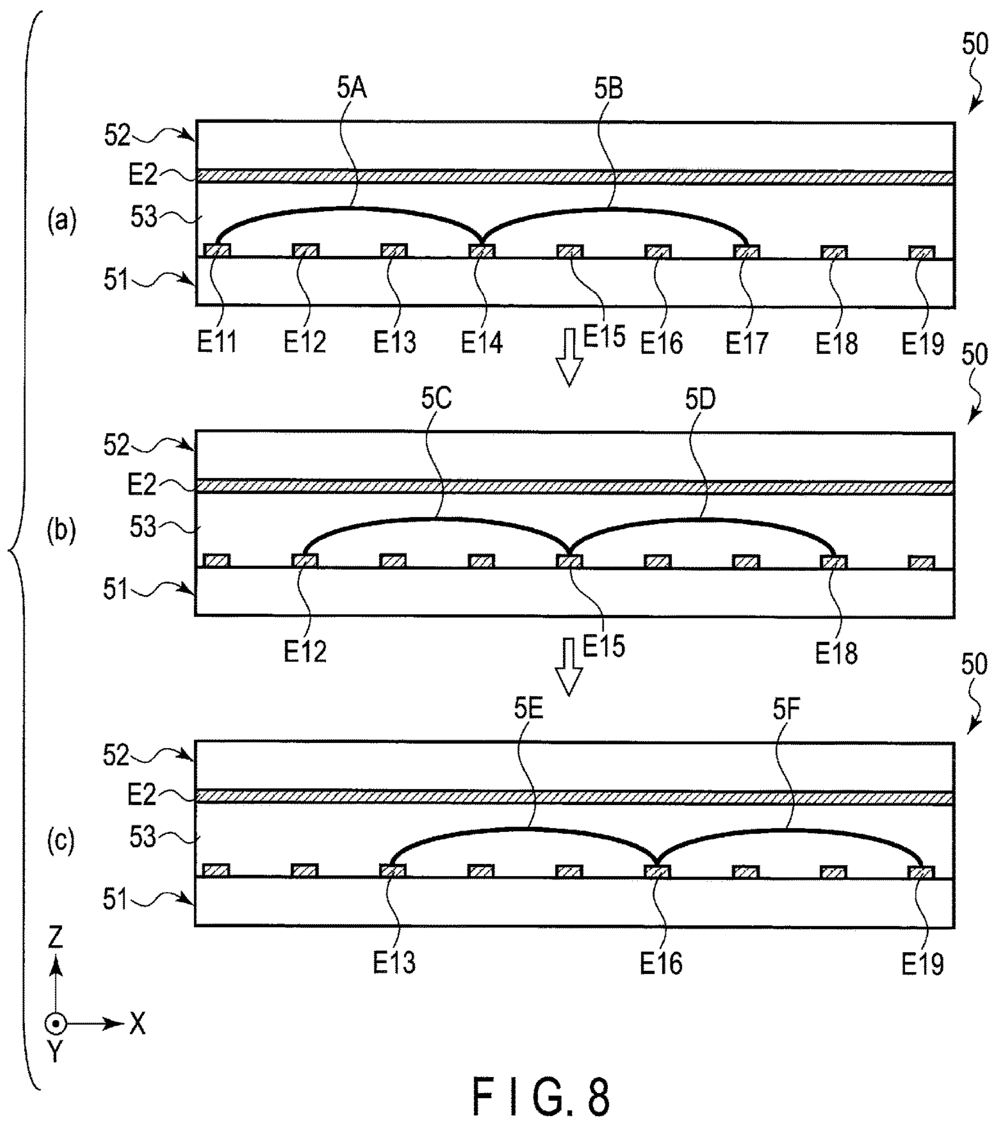
FIG. 8 is an illustration for explaining a formation example of the lens 5 provided in the liquid crystal element 50.

As shown in FIG. 8(*a*), in a state in which a voltage which is different from that applied to the second control electrode E2 is applied mainly to the first control electrodes E11, E14, and E17, a lens 5A extending over the first control electrodes E11 to E14 is formed, and also, a lens 5B extending over the first control electrodes E14 to E17 is formed.

As shown in FIG. 8(*b*), in a state in which a voltage which is different from that applied to the second control electrode E2 is applied mainly to the first control electrodes E12, E15, and E18, a lens 5C extending over the first control electrodes E12 to E15 is formed, and also, a lens 5D extending over the first control electrodes E15 to E18 is formed.

As shown in FIG. 8(c), in a state in which a voltage which is different from that applied to the second control electrode E2 is applied mainly to the first control electrodes E13, E16, and E19, a lens 5E extending over the first control electrodes E13 to E16 is formed, and also, a lens 5F extending over the first control electrodes E16 to E19 is formed.

In the example illustrated, when the lens 5A corresponds to the lens 5 in the first position P1 shown in FIG. 2(a), for example, a voltage applied to the first control electrodes E11 and E14, and the second control electrode E2 corresponds to a first voltage for forming the lens 5 at the first position P1 in the first mode. Also, when the lens 5C corresponds to the lens 5 in the second position P2 shown in FIG. 2(b), a voltage applied to the first control electrodes E12 and E15 and the second control electrode E2 corresponds to a second voltage for forming the lens 5 at the second position P2 in the second mode.

Figure 9:
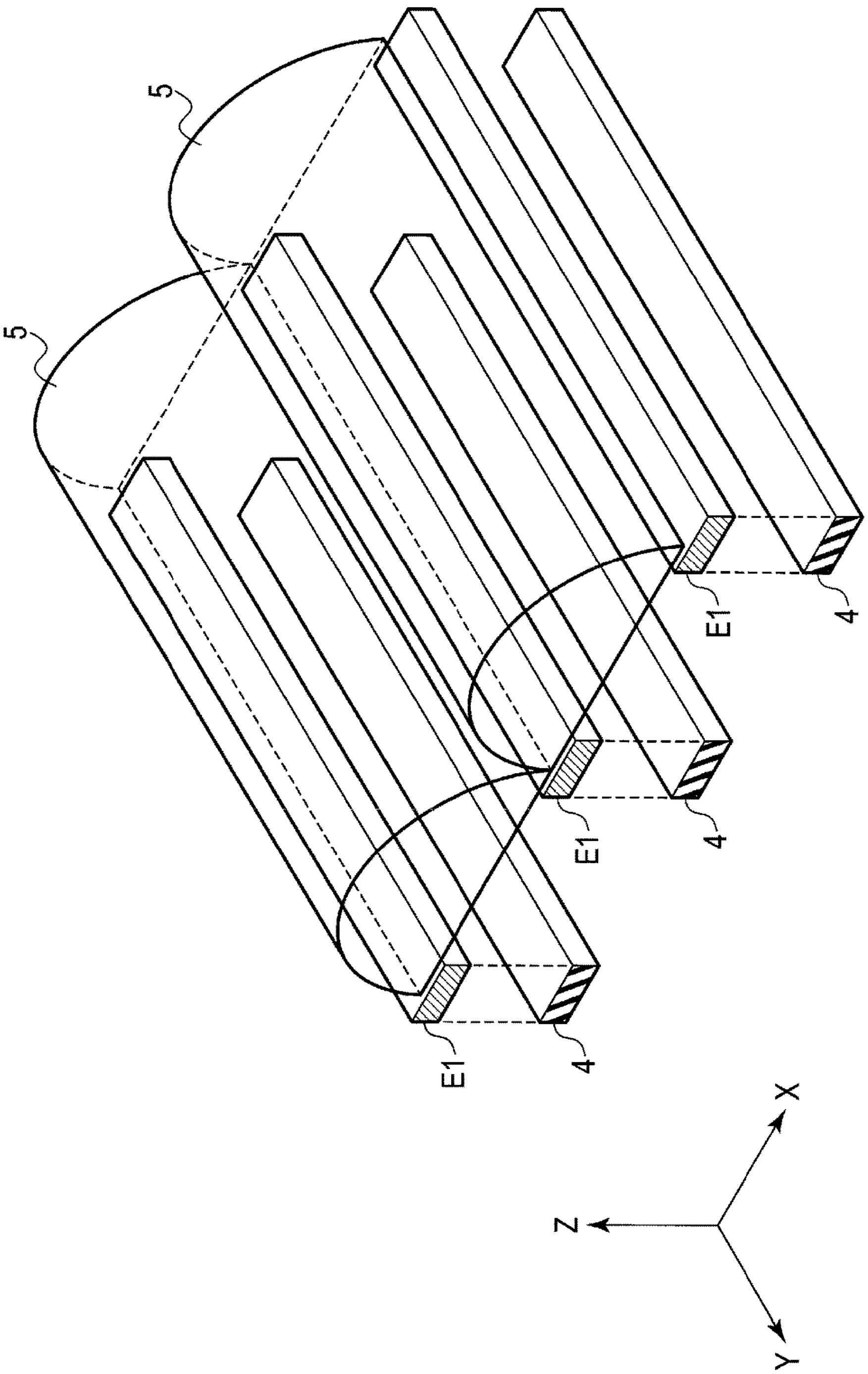
FIG. 9 is an illustration showing a configuration example of a light-shielding body 4 and the lens 5.

FIG. 9 is an illustration showing a configuration example of the light-shielding body 4 and the lens 5. Note that illustration of the liquid crystal element comprising the lens 5 and the second control electrode is omitted.

In one example, the first control electrodes E1 are arranged in the first direction X, each of the first control electrodes E1 extends in the second direction Y, and the lens 5 is a convex lens (a cylindrical lens) extending in the second direction Y and projecting in the third direction Z. The light-shielding body 4 extends in the second direction Y. Although the light-shielding body 4 is arranged at a position overlapping the first control electrode E1, a width of the light-shielding body 4 along the first direction X is not necessarily the same as a width of the first control electrode E1 along the first direction X. That is, a single light-shielding body 4 may overlap a plurality of first control electrodes E1. In a configuration example in which the light-shielding body 4 and the lens 5 extend in the second direction Y as described above, the emitting direction can be controlled such that it approximates a direction orthogonal to an extending direction of the light-shielding body 4 and the lens 5 in the X-Y plane, in other words, the first direction X, as has been described with reference to FIG. 2, etc. In a configuration example in which the light-shielding body 4 and the lens 5 extend in the first direction X, though this is not illustrated in the drawing, by changing a relative positional relationship between the light-shielding body 4 and the lens 5 along the second direction Y, the emitting direction can be controlled such that it approximates the second direction Y.

FIG. 10 is an illustration showing an example of arrangement of the light-shielding bodies 4. Here, an arrangement example in which the light-shielding bodies 4 are provided in the liquid crystal element 50 is described.

FIG. 10(a) corresponds to an arrangement example in which the light-shielding bodies 4 are provided on a first outer surface 51A of the first substrate 51. FIG. 10(b) corresponds to an arrangement example in which the light-shielding bodies 4 are provided on a first inner surface 51B of the first substrate 51. FIG. 10(c) corresponds to an arrangement example in which the light-shielding bodies 4 are provided on a second inner surface 52A of the second substrate 52. FIG. 10(d) corresponds to an arrangement example in which the light-shielding bodies 4 are provided on a second outer surface 52B of the second substrate 52.

In all of the arrangement examples, the light-shielding bodies 4 are fixed to predetermined positions, and the positions where they are arranged do not change in either of the modes. Each of these light-shielding bodies 4 is formed of a resin material colored black, for example, or opaque metal material. Alternatively, the light-shielding body 4 may be formed of a material which absorbs incident light, or a material which reflects the incident light. When the light-shielding body 4 is formed of a reflective material, the incident light can be recycled, and the efficiency of use of light can be improved. Further, a direction in which the light-shielding body 4 extends is parallel to a direction in which the first control electrode E1 extends, as has been explained with reference to FIG. 9. Accordingly, when the light-shielding body 4 is formed of a metal material or a conductive material, the light-shielding body 4 can also be used as the first control electrode E1.

Next, variations of the liquid crystal element 50 will be explained.

Figure 11:
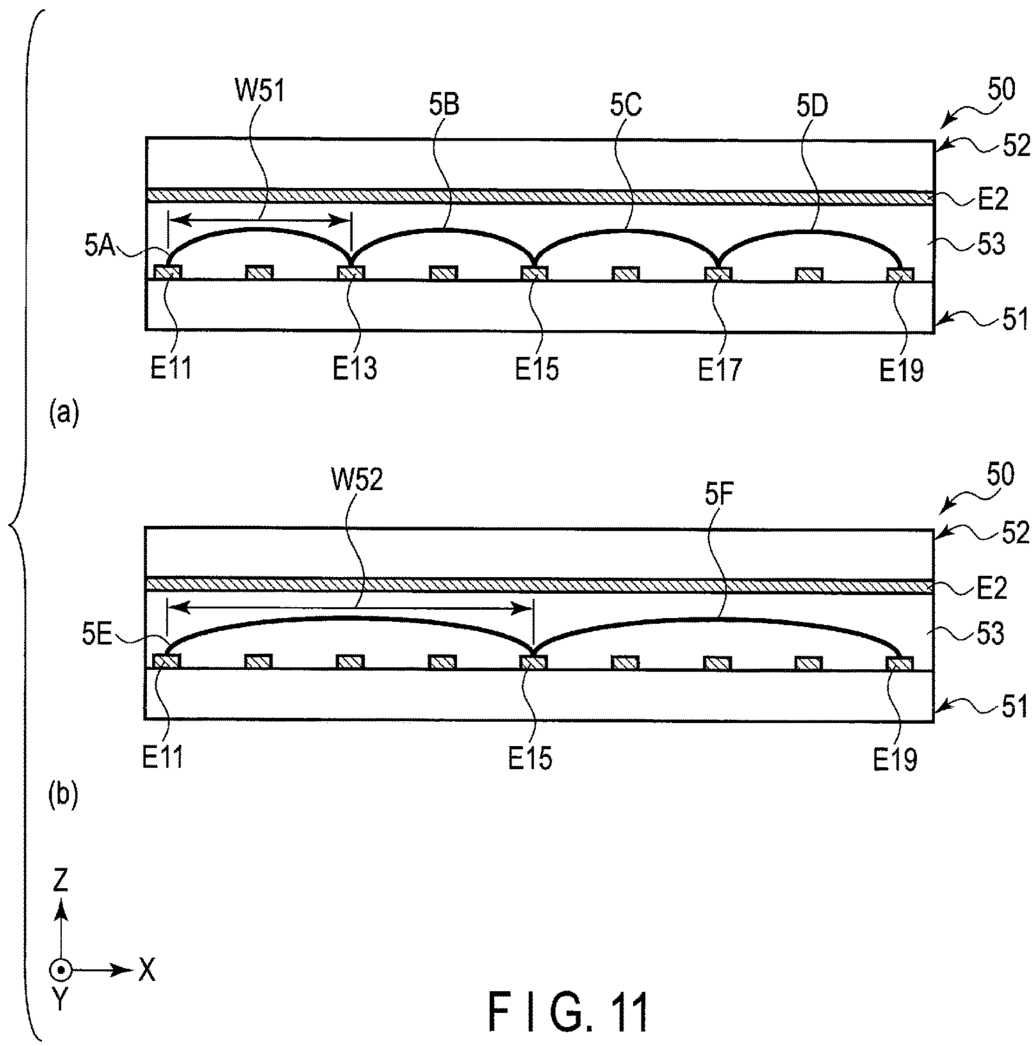
FIG. 11 is an illustration showing a first variation of the liquid crystal element 50.

FIG. 11 is an illustration showing a first variation of the liquid crystal element 50.

As shown in FIG. 11(a), in a state in which a voltage which is different from that applied to the second control electrode E2 is applied mainly to the first control electrodes E11, E13, E15, E17, and E19, each of a lens 5A extending over the first control electrodes E11 to E13, a lens 5B extending over the first control electrodes E13 to E15, a lens 5C extending over the first control electrodes E15 to E17, and a lens 5D extending over the first control electrodes E11 to E19 is formed. The lenses 5A to 5D each correspond to a first lens having a first width W51 along the first direction X. The first width W51 corresponds to a pitch between the first control electrodes E11 and E13 along the first direction X, for example.

As shown in FIG. 11(b), in a state in which a voltage which is different from that applied to the second control electrode E2 is applied mainly to the first control electrodes E11, E15, and E19, each of a lens 5E extending over the first control electrodes E11 to E15, and a lens 5F extending over the first control electrodes E15 to E19 is formed. The lenses 5E to 5F each correspond to a second lens having a second width W52 along the first direction X. The second width W52 is different from the first width W51, and in the example illustrated, the second width W52 is greater than the first width W51. The second width W52 corresponds to a pitch between the first control electrodes E11 and E15 along the first direction X, for example.

As stated above, the voltages applied to the first control electrode and the second control electrode are controlled by the illumination controller. In the example illustrated in FIG. 11(a), the voltage applied to the first control electrodes E11 and E13 and the second control electrode E2 corresponds to the first voltage for forming the first lens 5A. Further, in the example illustrated in FIG. 11(b), the voltage applied to the first control electrodes E11 and E15 and the second control electrode E2 corresponds to the second voltage for forming the second lens 5E.

Also in this configuration example, the same advantage as that of the above-described configuration example can be obtained. In addition, by selectively switching the first lens and the second lens having different widths, a range of the emitting direction and a focusing position of the emitted light can be controlled.

Figure 12:
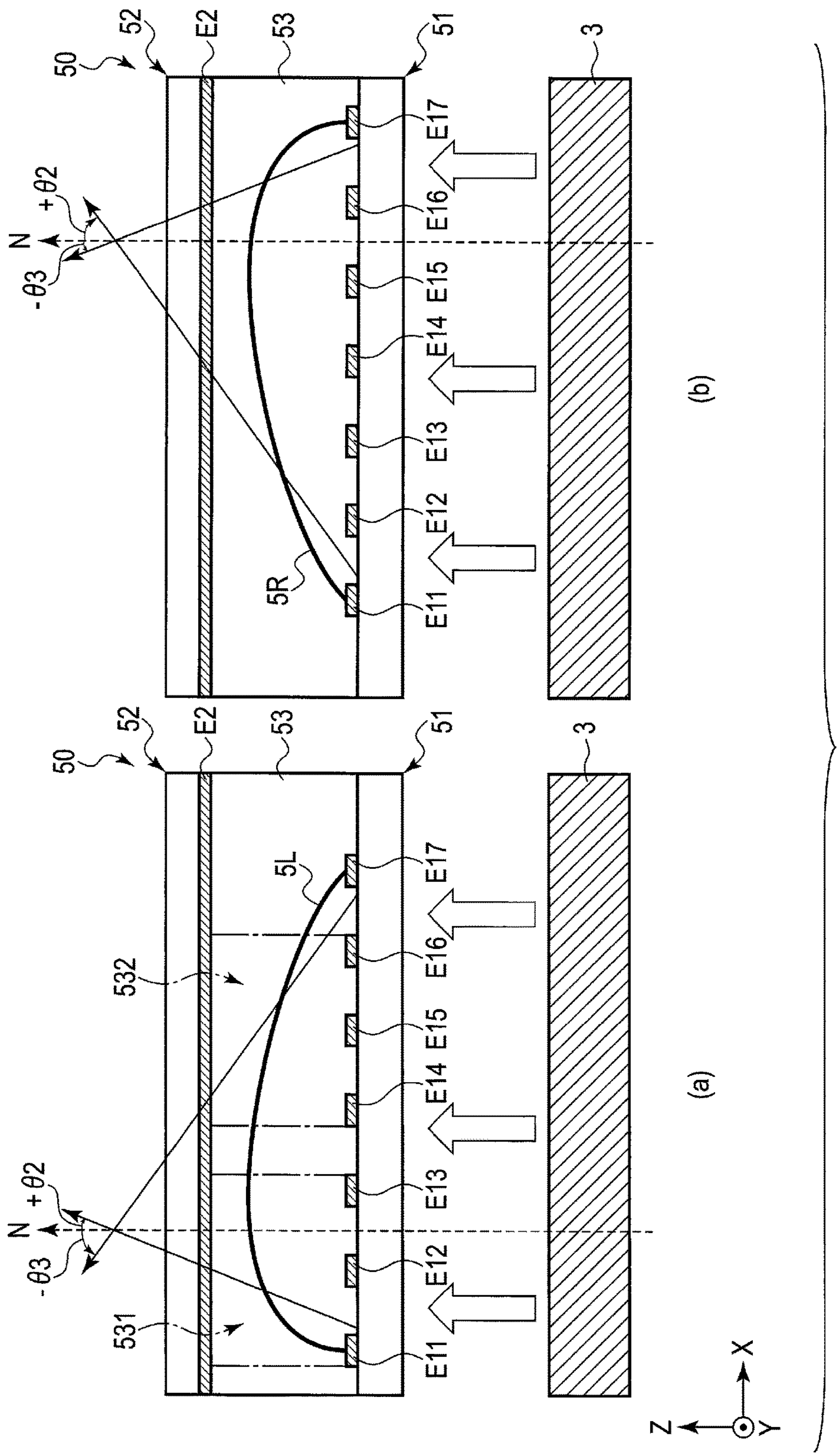
FIG. 12 is an illustration showing a second variation of the liquid crystal element 50.

FIG. 12 is an illustration showing a second variation of the liquid crystal element 50.

As shown in FIG. 12(a), in a state in which a voltage which is different from that applied to the second control electrode E2 is applied to the first control electrodes E11 to E17, a lens 5L extending over the first control electrodes E11 to E17 is formed. The lens 5L is a lens which is unsymmetrical with respect to the normal N of the light source unit 3 or the normal N of the first substrate 51. In a first region 531 on the left side of the drawing, that is, the region extending over the first control electrodes E11 to E13, and a second region 532 on the right side of the drawing, that is, the region extending over the first control electrodes E14 to E16, the lens 5L has different refractive-index distributions. Such a lens 5L can be formed by setting the voltages of the first control electrodes E11 to E17 to, for example, 6V, 5V, 4V, 3V, 2V, 1V, and 6V, respectively, and setting the voltage of the second control electrode E2 to 0V. The lens 5L refracts the emitted light from the light source unit 3. An emitting direction of the emitted light falls within a range that is unsymmetrical with respect to the normal N. When a range of the emitting direction is assumed as a range of +θ2 and −θ3 with respect to the normal N, θ2 is smaller than θ3.

As shown in FIG. 12(*b*), in a state in which a voltage which is different from that applied to the second control electrode E2 is applied to the first control electrodes E11 to E17, a lens 5R extending over the first control electrodes E11 to E17 is formed. The lens 5R is a lens which is unsymmetrical with respect to the normal N. Such a lens 5R can be formed by setting the voltages of the first control electrodes E11 to E17 to, for example, 6V, 1V, 2V, 3V, 4V, 5V and 6V, respectively, and setting the voltage of the second control electrode E2 to 0V. The lens 5R refracts the emitted light from the light source unit 3. An emitting direction of the emitted light falls within a range that is unsymmetrical with respect to the normal N. When a range of the emitting direction is assumed as a range of +θ2 and −θ3 with respect to the normal N, 62 is greater than θ3.

FIG. 13 is an illustration for explaining a formation example of the lenses 5L and 5R shown in FIG. 12.

As shown in FIG. 13(*a*), in a state in which voltages of the first control electrodes E11 to E17 arranged in the first direction X are set such that they are gradually reduced relative to a voltage of the second control electrode E2, the unsymmetrical lens 5L extending over the first control electrodes E11 to E17 is formed.

As shown in FIG. 13(*b*), in a state in which the voltages of mainly the first control electrodes E11 and E17 are set to be the same, and the voltages of the first control electrodes E12 to E16 are each set to 0V or smaller than the voltage of the first control electrode E11, a symmetrical lens 5M extending over the first control electrodes E11 to E17 is formed.

As shown in FIG. 13(*c*), in a state in which the voltages of the first control electrodes E11 to E17 are set such that they are gradually increased relative to the voltage of the second control electrode E2, the unsymmetrical lens 5R extending over the first control electrodes E11 to E17 is formed.

In the example illustrated, the lens 5M shown in FIG. 13(*b*) corresponds to the first lens having a symmetrical shape, and the voltage applied to the first control electrodes E11 to E17 and the second control electrode E2 corresponds to the first voltage for forming the first lens 5M. Each of the lens 5L shown in FIG. 13(*a*), and the lens 5R shown in FIG. 13(*c*) corresponds to the second lens having an unsymmetrical shape, and the voltage applied to the first control electrodes E11 to E17 and the second control electrode E2 corresponds to the second voltage for forming the second lenses 5L and 5R.

Also in this configuration example, likewise the above configuration example, by the unsymmetrically-shaped lenses 5L and 5R, the emitting direction can be controlled such that it approximates the first direction X in the X-Y plane. In addition, in the second variation in which the liquid crystal element 50 can form the unsymmetrically-shaped lens, the emitting direction can be controlled without using the light-shielding body.

FIG. 14 is an illustration showing a third variation of the liquid crystal element 50.

The configuration example shown in FIG. 14 is different from the above configuration example in that a plurality of second control electrodes E21 to E23 are arranged at intervals in the first direction X, and each of the second control electrodes E21 to E23 is a strip electrode extending in the second direction Y. In other words, the extending direction of the second control electrodes E21 to E23 is parallel to the extending direction of the first control electrodes E11 to E13.

In this configuration example, by applying a predetermined voltage mainly to each of the first control electrodes E11 to E13, the lenses 5A and 5B are formed, and by applying a predetermined voltage mainly to each of the second control electrodes E21 to E23, the lenses 5C and 5D are formed. Each of the lenses 5A and 5B is a convex lens extending in the second direction Y, and projecting upward along the third direction Z. Also, each of the lenses 5C and 5D is a convex lens extending in the second direction Y, and projecting downward along the third direction Z.

For example, by setting the voltage of each of the second control electrodes E21 to E23 to 0V, the voltage of each of the first control electrodes E11 and E13 to 6V, and the voltage of the first control electrode E12 to −6V, the lenses 5A and 5B can be formed without forming the lenses 5C and 5D. Similarly, by setting the voltage of each of the first control electrodes E11 to E13 to 0V, the voltage of each of the second control electrode E21 and E23 to 6V, and the voltage of the second control electrode E22 to −6V, the lenses 5C and 5D can be formed without forming the lenses 5A and 5B. In addition, by setting the voltage of each of the first control electrodes E11 and E13 to −6V, and the voltage of the first control electrode E12 to +6V, and also setting the voltage of each of the second control electrodes E21 and E23 to −6V, and the voltage of the second control electrode E22 to +6V, the lenses 5A and 5B and the lenses 5C and 5D can be formed simultaneously.

Also in this configuration example, the same advantage as that of the above-described configuration example can be obtained.

FIG. 15 is an illustration showing a fourth variation of the liquid crystal element 50.

The configuration example shown in FIG. 15 is different from the above configuration example in that the second control electrodes E21 to E23 are arranged at intervals in the second direction Y, and each of the second control electrodes E21 to E23 is a strip electrode extending in the first direction X. In other words, the extending direction of the second control electrodes E21 to E23 crosses the extending direction of the first control electrodes E11 to E13.

In this configuration example, by applying a predetermined voltage mainly to each of the first control electrodes E11 to E13, the lenses 5A and 5B are formed, and by applying a predetermined voltage mainly to each of the second control electrodes E21 to E23, the lenses 5E and 5F are formed. Each of the lenses 5A and 5B is a convex lens extending in the second direction Y, and projecting upward along the third direction Z. Also, each of the lenses 5E and 5F is a convex lens extending in the first direction X, and projecting downward along the third direction Z.

For example, by setting the voltage of each of the second control electrodes E21 to E23 to 0V, the voltage of each of the first control electrodes E11 and E13 to 6V, and the voltage of the first control electrode E12 to −6V, the lenses 5A and 5B can be formed without forming the lenses 5E and 5F. Similarly, by setting the voltage of each of the first control electrodes E11 to E13 to 0V, the voltage of each of the second control electrode E21 and E23 to 6V, and the voltage of the second control electrode E22 to −6V, the lenses 5E and 5F can be formed without forming the lenses 5A and 5B.

Also in this configuration example, as the lenses 5A and 5B are formed without forming the lenses 5E and 5F, the emitting direction can be controlled such that it approximates the first direction X in the X-Y plane, as in the above configuration example. In addition, by forming the lenses 5E and 5F without forming the lenses 5A and 5B, the emitting direction can be controlled such that it approximates the second direction Y in the X-Y plane.

Next, the liquid crystal element 40 comprising the light-shielding body 4 will be described. The liquid crystal element 40 corresponds to a second liquid crystal element.

Figure 16:
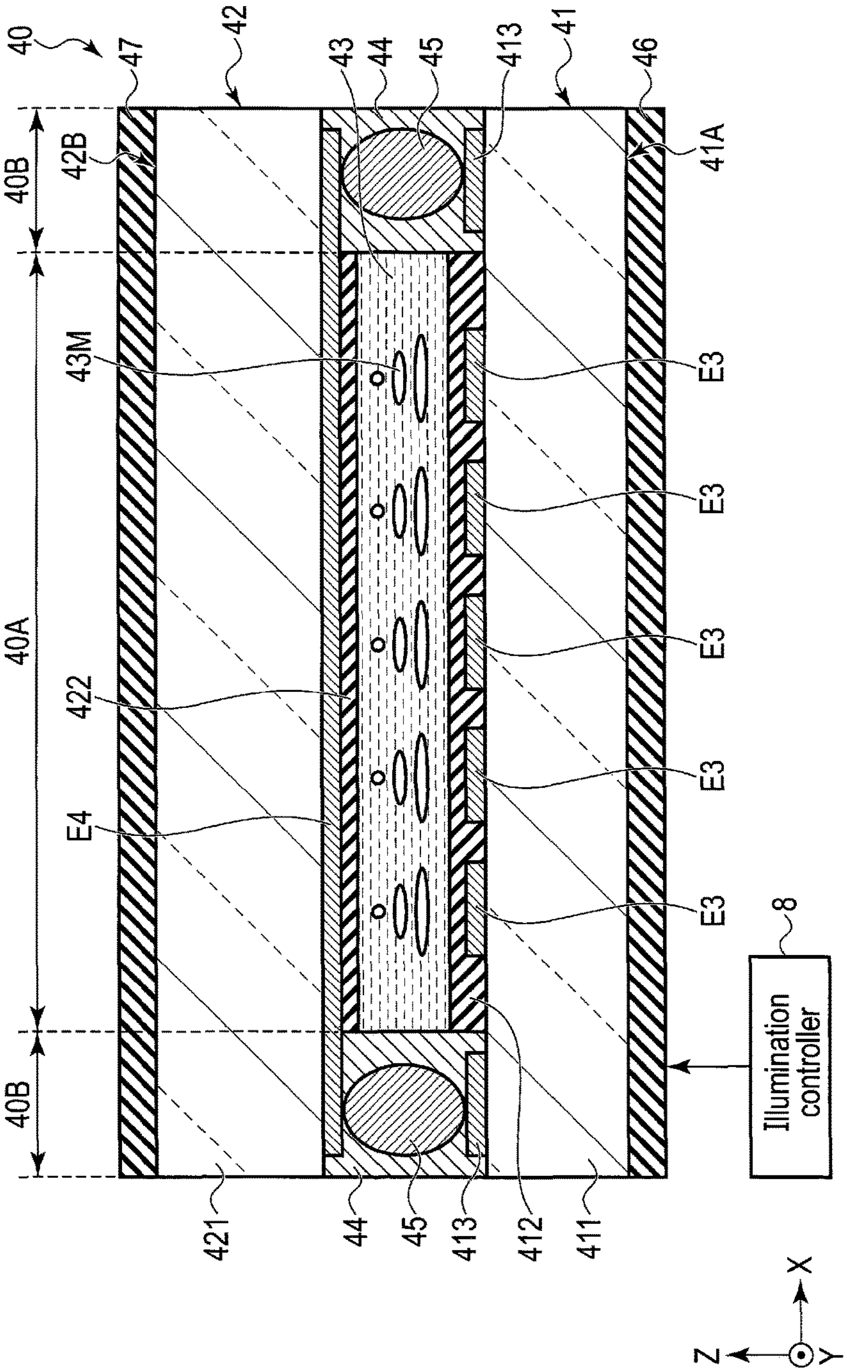
FIG. 16 is a cross-sectional view showing a configuration example of a liquid crystal element 40.

FIG. 16 is a cross-sectional view showing a configuration example of the liquid crystal element 40.

The liquid crystal element 40 comprises a third substrate 41, a fourth substrate 42, a second liquid crystal layer 43, a third control electrode E3, a fourth control electrode E4, a first polarizer 46, and a second polarizer 47. In the example illustrated, the third control electrode E3 is provided on the third substrate 41, and the fourth control electrode E4 is provided on the fourth substrate 42. However, the third control electrode E3 and the fourth control electrode E4 may both be provided on the same substrate, that is, on the third substrate 41 or the fourth substrate 42.

The third substrate 41 comprises an insulating substrate 411, a plurality of third control electrodes E3, an alignment film 412, and a feeder 413. The third control electrode E3 is located between the insulating substrate 411 and the second liquid crystal layer 43. The third control electrodes E3 are arranged at intervals in the first direction X in an effective area 40A. In one example, a width of each of the third control electrodes E3 along the first direction X is greater than an interval between adjacent third control electrodes E3 along the first direction X. The alignment film 412 covers the third control electrodes E3, and is in contact with the second liquid crystal layer 43. The feeder 413 is located in a non-effective area 40B outside the effective area 40A.

The fourth substrate 42 comprises an insulating substrate 421, the fourth control electrode E4, and an alignment film 422. The fourth control electrode E4 is located between the insulating substrate 421 and the second liquid crystal layer 43. The fourth control electrode E4 is, for example, a single plate electrode which is located on substantially the entire surface of the effective area 40A, and also extends to the non-effective area 40B. The fourth control electrode E4 is opposed to the third control electrode E3 via the second liquid crystal layer 43 in the effective area 40A. The fourth control electrode E4 is opposed to the feeder 413 in the non-effective area 40B. The alignment film 422 covers the fourth control electrode E4, and is in contact with the second liquid crystal layer 43.

The first polarizer 46 is arranged on a third outer surface 41A of the third substrate 41. The second polarizer 47 is arranged on a fourth outer surface 42B of the fourth substrate 42.

Each of the insulating substrates 411 and 421 is, for example, a glass substrate or a resin substrate. Each of the third control electrode E3 and the fourth control electrode E4 is formed of a transparent conductive material such as indium tin oxide (ITO) or indium zinc oxide (IZO). The third control electrode E3 is a strip electrode extending in the second direction Y, similarly to the first control electrode E1 shown in FIG. 5. The fourth control electrode E4 is a rectangular plate electrode, similarly to the second control electrode E2 shown in FIG. 5. Each of the alignment films 412 and 422 is, for example, a horizontal alignment film. In one example, the alignment film 412 is subjected to alignment treatment in the first direction X, and the alignment film 422 is subjected to alignment treatment in the second direction Y.

The third substrate 41 and the fourth substrate 42 are bonded to each other by a sealant 44 in the non-effective area 40B. The sealant 44 includes a conductive material 45. The conductive material 45 is interposed between the feeder 413 and the fourth control electrode E4, and electrically connects the feeder 413 and the fourth control electrode E4.

The second liquid crystal layer 43 is held between the third substrate 41 and the fourth substrate 42. The second liquid crystal layer 43 is formed of, for example, a liquid crystal material having positive dielectric anisotropy. The third control electrode E3 and the fourth control electrode E4 apply, to the second liquid crystal layer 43, a voltage for forming the light-shielding body 4 in the second liquid crystal layer 43.

The illumination controller 8 controls the voltage to be applied to the second liquid crystal layer 43. By controlling the voltage to be applied to each of the third control electrode E3 and the fourth control electrode E4, the illumination controller 8 can switch a mode between a mode in which the light-shielding body is formed in the second liquid crystal layer 43 and a mode in which a light-shielding body is not formed in the second liquid crystal layer 43. Further, by controlling the voltage to be applied to each of the third control electrodes E3, the illumination controller 8 can control a position where the light-shielding body is formed. More specifically, the illumination controller 8 can form the light-shielding body 4 at each of the first position P1 and the second position P2, as in the case of the lens 5 explained with reference to FIGS. 2 and 3. Furthermore, by controlling the voltage to be applied to each of the third control electrodes E3, the illumination controller 8 can control the size of the light-shielding body 4 freely.

FIG. 17 is an illustration for explaining the light-shielding body 4 formed in the liquid crystal element 40. FIG. 17 illustrates only the structures necessary for explanation. Here, a case where a voltage, which is different from that applied to the fourth control electrode E4, is applied to third control electrodes E31, E33, and E35, of a plurality of third control electrodes E31 to E35 arranged in the first direction X, will be described.

In one example, the voltage of the third control electrodes 531, E33, and E35 is 6V, and the voltage of the third control electrode E32 and the fourth control electrode E4 is 0V. In addition, as described above, the second liquid crystal layer 43 has positive dielectric anisotropy. Liquid crystal molecules 43M included in the second liquid crystal layer 43 are twist-aligned at an angle of 90° in a state where no electric field is formed. In other words, the liquid crystal molecules 43M near the alignment film 412 are initially aligned such that their major axes are aligned in the first direction X, and the liquid crystal molecules 43M near the alignment film 422 are initially aligned such that their major axes are aligned in the second direction Y. Further, the liquid crystal molecules 43M are aligned such that their major axes are aligned along an electric field in a state where the electric field is formed.

In a region in which each of the third control electrodes E31, E33, and E35 is opposed to the fourth control electrode E4, an electric field along the third direction Z is formed. Therefore, the liquid crystal molecules 43M are vertically aligned such that their major axes are aligned along the third direction Z. In a region in which each of the third control electrodes E32 and E34 is opposed to the fourth control electrode E4, an electric field is not formed. Therefore, the liquid crystal molecules 43M are maintained in the initial alignment state, and twist-aligned.

In the example illustrated, a transmission axis 46T of the first polarizer 46 is set to the first direction X, and a transmission axis 47T of the second polarizer 47 is set to the second direction Y. Accordingly, light incident on the third substrate 41 through the first polarizer 46 is linearly polarized light L1 having an oscillation plane along the first direction X. A polarization axis of the linearly polarized light L1, which is incident on a region in which the third control electrode E32 and the fourth control electrode E4 are opposed to each other, is rotated due to influence of the liquid crystal molecules 43M twist-aligned, and the linearly polarized light L1 is changed to linearly polarized light L2 having an oscillation plane along the second direction Y after passing through the second liquid crystal layer 43. The linearly polarized light L2 passes through the second polarizer 47. Also in a region in which the third control electrode E34 and the fourth control electrode E4 are opposed to each other, the linearly polarized light L2 is similarly transmitted. Meanwhile, the linearly polarized light L1 incident on a region in which the third control electrode E33 and the fourth control electrode E4 are opposed to each other is hardly influenced by the liquid crystal molecules 43M that are vertically aligned, and passes through the second liquid crystal layer 43 while the polarization axis is kept unchanged. Such linearly polarized light L1 is absorbed by the second polarizer 47. In regions in which the third control electrodes E31 and E35 are opposed to the fourth control electrode E4, the linearly polarized light L1 is similarly absorbed.

In other words, regions in which the third control electrodes E31, E33, and E35 are opposed to the fourth control electrode E4 correspond to the light-shielding bodies 4A which block light as shown in FIG. 2, and regions in which the third control electrodes E32 and E34 are opposed to the fourth control electrode E4 correspond to gaps G4 through which light is transmitted as shown in FIG. 2. In a case where each of the third control electrodes E3 is a strip electrode extending in the second direction Y, the light-shielding bodies 4 are also formed in a strip shape extending in the second direction Y.

In the present embodiment, a system in which the second liquid crystal layer 43 including liquid crystal molecules twist-aligned in the initial alignment state, and an electric field formed along a direction intersecting the substrate main surface are combined has been explained, as an example of the liquid crystal element 40 comprising the light-shielding body 4. However, the liquid crystal element 40 comprising the light-shielding body 4 is not limited to the above. That is, as long as the system can selectively make a change between a state in which the light is blocked and a state in which light is transmitted in accordance with a voltage to be applied to the second liquid crystal layer 43, a liquid crystal element comprising the light-shielding body 4 can be realized.

Figure 18:
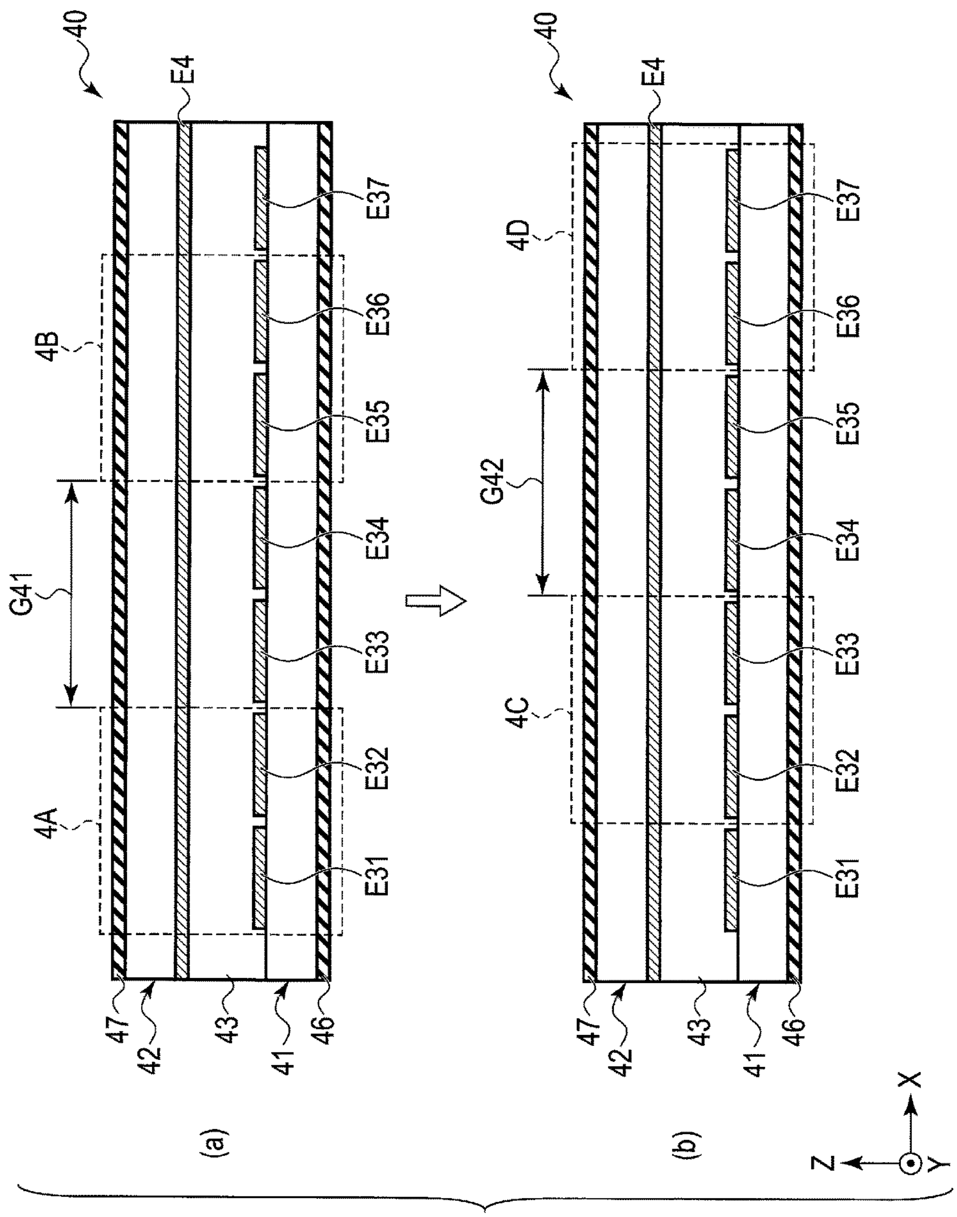
FIG. 18 is an illustration for explaining a formation example of the light-shielding body 4 provided in the liquid crystal element 40.

FIG. 18 is an illustration for explaining a formation example of the light-shielding body 4 provided in the liquid crystal element 40.

The third substrate 41 comprises the third control electrodes E31 to E37 arranged at substantially regular intervals in the first direction X. The fourth control electrode E4 is opposed to the third control electrodes E31 to E37 with the second liquid crystal layer 43 interposed therebetween.

As shown in FIG. 18(*a*), in a state in which a voltage which is different from that applied to the fourth control electrode E4 is applied mainly to the third control electrodes E31, E32, E35, and E36, the light-shielding body 4A extending over the third control electrodes E31 and E32 is formed, and also, the light-shielding body 4B extending over the third control electrodes E35 and E36 is formed. Also, a gap G41 extending over the third control electrodes E33 and E34 is formed.

As shown in FIG. 18(*b*), in a state in which a voltage which is different from that applied to the fourth control electrode E4 is applied mainly to the third control electrodes E32, E33, E36, and E37, a light-shielding body 4C extending over the third control electrodes E32 and E33 is formed, and also, a light-shielding body 4D extending over the third control electrodes E36 and E37 is formed. Also, a gap G42 extending over the third control electrodes E34 and E35 is formed.

In the example illustrated, when the light-shielding bodies 4A and 4B correspond to the light-shielding bodies in the first position P1 shown in FIG. 2(*a*), for example, a voltage applied to the third control electrodes E31, E32, E35, and E36, and the fourth control electrode E4 corresponds to a third voltage for forming the light-shielding bodies at the first position P1 in the first mode. Also, when the light-shielding bodies 4C and 4D correspond to the light-shielding bodies in the second position P2 shown in FIG. 2(*b*), a voltage applied to the third control electrodes E32, E33, E36, and E37, and the fourth control electrode E4 corresponds to a fourth voltage for forming the light-shielding bodies at the second position P2 in the second mode.

Figure 19:
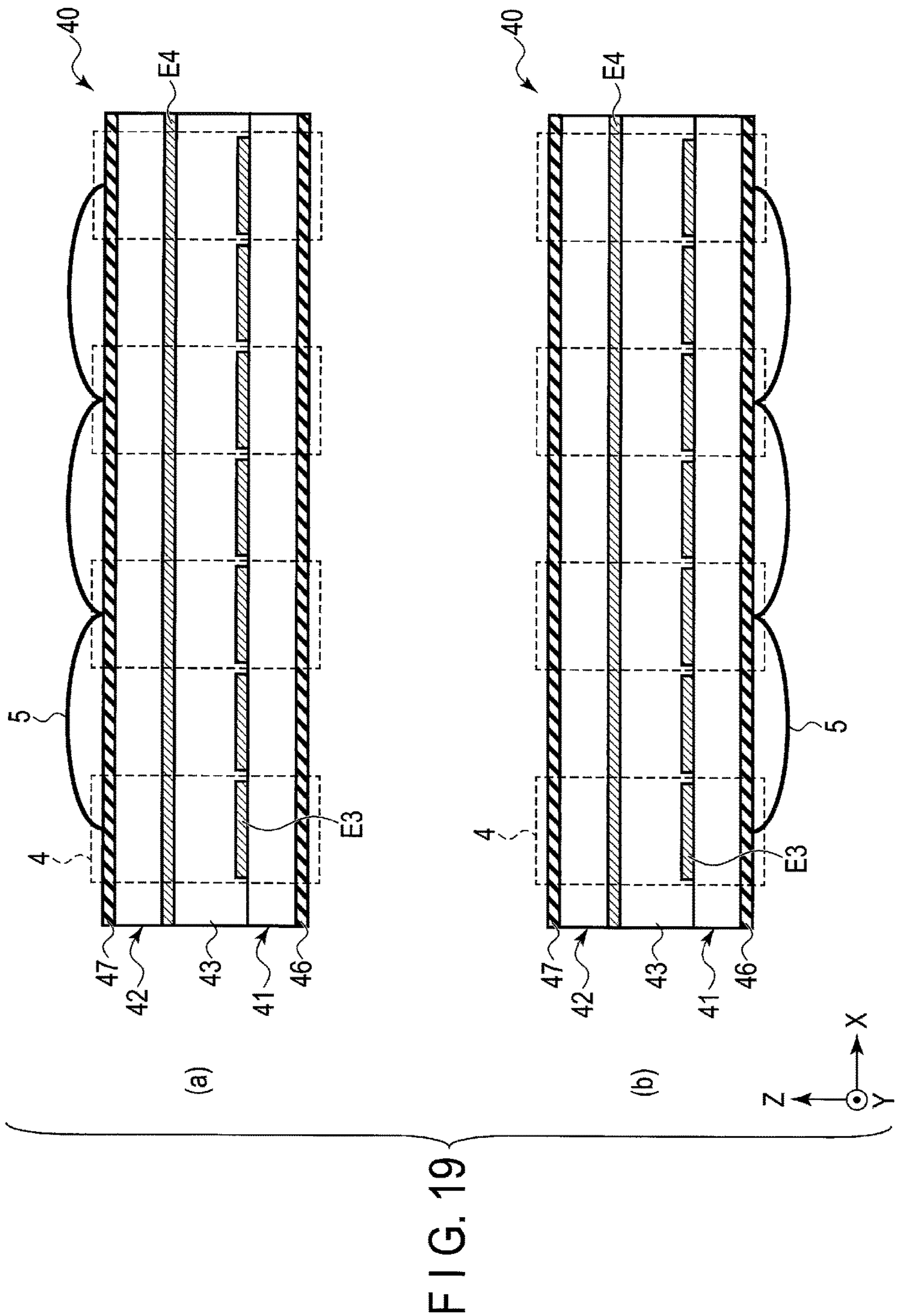
FIG. 19 is an illustration showing an example of arrangement of the lenses 5.

FIG. 19 is an illustration showing an example of arrangement of the lenses 5. Here, an arrangement example in which the lenses 5 are provided in the liquid crystal element 40 is described.

FIG. 19(*a*) corresponds to an arrangement example in which the lenses 5 are provided on the second polarizer 47. FIG. 19(*b*) corresponds to an arrangement example in which the lenses 5 are provided on the first polarizer 46. Alternatively, a lens sheet on which the lenses 5 are formed may be attached to any of the third substrate 41, the fourth substrate 42, the first polarizer 46, and the second polarizer 47.

In all of the arrangement examples, the lenses 5 are fixed to predetermined positions, and the positions where they are arranged do not change in either of the modes. Such lenses 5 are formed of, for example, a transparent resin material or glass.

Next, variations of the liquid crystal element 40 will be explained.

Figure 20:
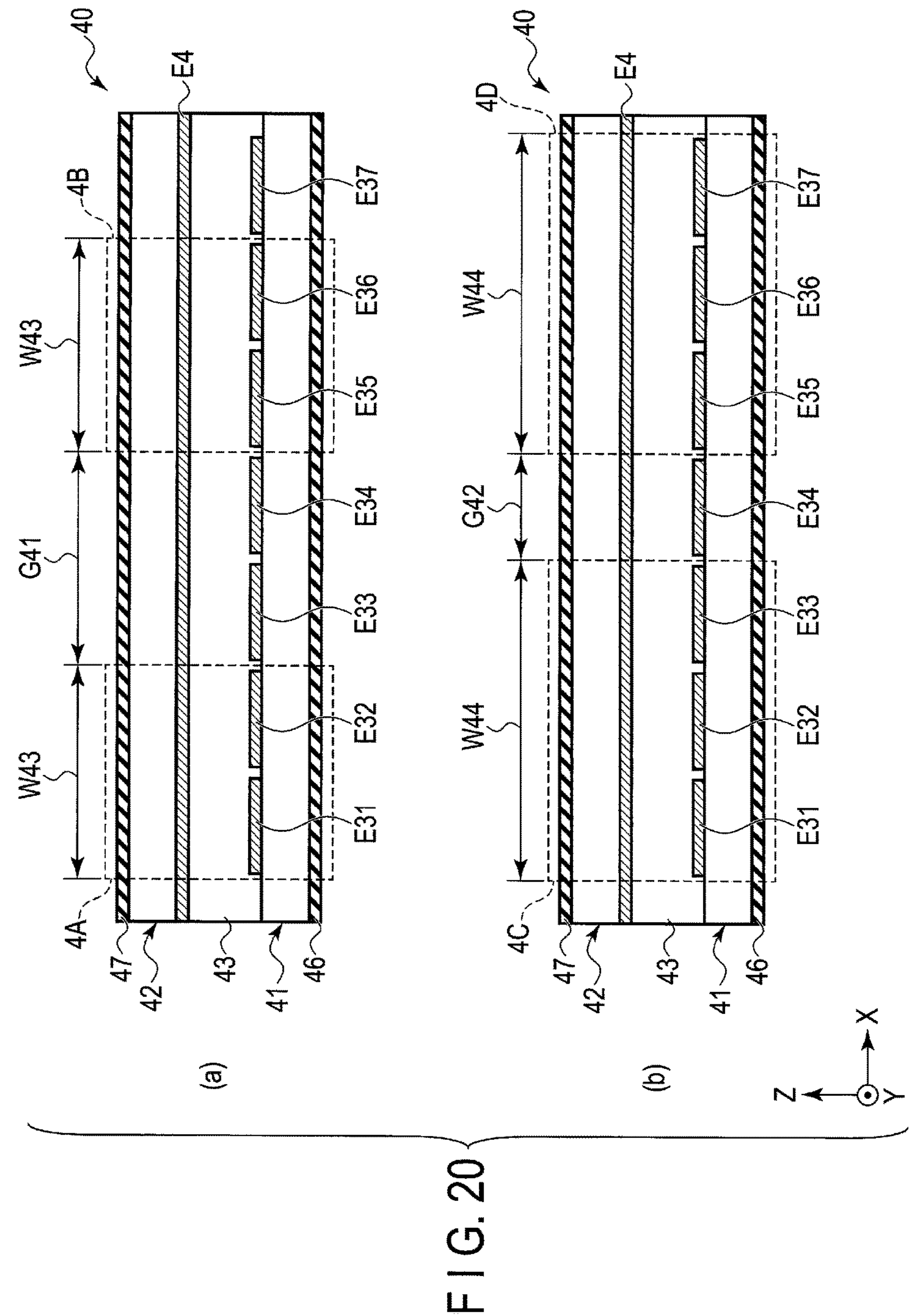
FIG. 20 is an illustration showing a variation of the liquid crystal element 40.

FIG. 20 is an illustration showing a variation of the liquid crystal element 40.

As shown in FIG. 20(*a*), in a state in which a voltage which is different from that applied to the fourth control electrode E4 is applied mainly to the third control electrodes E31, E32, E35, and E36, each of the light-shielding body 4A extending over the third control electrodes E31 and E32 and the light-shielding body 4B extending over the third control electrodes E35 and E36 is formed. The light-shielding bodies 4A and 4B each correspond to a first light-shielding body having a third width W43 along the first direction X. The third width W43 corresponds substantially to a width of the third control electrodes E31 and E32 along the first direction X, for example. Also, the gap G41 corresponds substantially to a width of the third control electrodes E33 and E34 along the first direction X. In the example illustrated, although the third width W43 and the gap G41 are equal to each other in size, their sizes may be different. The third width W43 and the gap G41 can be controlled in accordance with the number of third control electrodes to which voltages are applied.

As shown in FIG. 20(*b*), in a state in which a voltage which is different from that applied to the fourth control electrode E4 is applied mainly to the third control electrodes E31 to E33, and E35 to E37, each of the light-shielding body 4C extending over the third control electrodes E31 to E33 and the light-shielding body 4D extending over the third control electrodes E35 to E37 is formed. The light-shielding bodies 4C and 4D each correspond to a second light-shielding body having a fourth width W44 along the first direction X. The third width W43 is different from the fourth width W44, and in the example illustrated, the fourth width W44 is greater than the third width W43. The fourth width W44 corresponds substantially to a width of the third control electrodes E31 to E33 along the first direction X, for example. Also, the gap G42 corresponds substantially to a width of the third control electrode E34 along the first direction X. In the example illustrated, although the fourth width W44 is greater than the gap G42, they may be equal to each other. The fourth width W44 and the gap G42 can be controlled in accordance with the number of third control electrodes to which voltages are applied.

As stated above, the voltages applied to the third control electrode and the fourth control electrode are controlled by the illumination controller. In the example illustrated in FIG. 20(*a*), the voltage applied to the third control electrodes E31 and E32 and the fourth control electrode E4 corresponds to the third voltage for forming the first light-shielding body 4A having the third width W43. Also, in the example illustrated in FIG. 20(*b*), the voltage applied to the third control electrodes E31 to E33 and the fourth control electrode E4 corresponds to the fourth voltage for forming the second light-shielding body 4C having the fourth width W44.

Also in this configuration example, the same advantage as that of the above-described configuration example can be obtained. In addition, by selectively switching the first light-shielding body and the second light-shielding body having different widths, a range of the emitting direction and a focusing position of the emitted light can be controlled.

Next, an example of the display device DSP will be explained.

FIG. 21 is an illustration showing a first example of the display device DSP. More specifically, the display device DSP comprises the display panel 1, the light source unit 3, the light-shielding body 4, and the liquid crystal element 50 which can form the lens 5. In the example illustrated, while the light-shielding body 4 is provided on the first outer surface 51A of the first substrate 51, it may be provided at any place between the display panel 1 and the light source unit 3. The display panel 1 comprises an array substrate 11, a counter-substrate 12, a liquid crystal layer 13, a sealant 14, polarizers 15 and 16, etc. The light-shielding body 4 and the liquid crystal element 50 are located between the light source unit 3 and the polarizer 15. When the lens 5 provided in the liquid crystal element 50 has the function of refracting the first polarized light POL1 as explained with reference to FIG. 7, a transmission axis of the polarizer 15 is set parallel to the first direction X so as to allow the first polarized light POL1 to be transmitted.

FIG. 22 is an illustration showing a basic structure and an equivalent circuit of the display panel 1 shown in FIG. 21.

The display panel 1 includes a display area DA in which an image is displayed, and a non-display area NDA which surrounds the display area DA. The display area DA comprises a plurality of pixels PX. Here, the pixel indicates a minimum unit which can be individually controlled in accordance with a pixel signal, and exists in, for example, an area including a switching element arranged at a position where a scanning line and a signal line, which will be described later, cross each other. The pixels PX are arrayed in a matrix in the first direction X and the second direction Y. Also, the display panel 1 includes scanning lines (also referred to as gate lines) G (G1 to Gn), signal lines (also referred to as data lines or source lines) S (S1 to Sm), a common electrode CE, etc., in the display area DA. The scanning lines G extend in the first direction X, and are arranged in the second direction Y. The signal lines S extend in the second direction Y, and are arranged in the first direction X. Note that the scanning lines G and the signal lines S do not necessarily extend linearly, and may be partially bent. The common electrode CE is disposed over the pixels PX. The scanning lines G are connected to a scanning line drive circuit GD, the signal lines S are connected to a signal line drive circuit SD, and the common electrode CE is connected to a common electrode drive circuit CD. The scanning line drive circuit GD, the signal line drive circuit SD, and the common electrode drive circuit CD are controlled by the display controller 7.

Each of the pixels PX comprises a switching element SW, a pixel electrode PE, the common electrode CE, the liquid crystal layer 13, and the like. The switching element SW is constituted by a thin-film transistor (TFT), for example, and is electrically connected to the scanning line G and the signal line S. More specifically, the switching element SW includes a gate electrode WG, a source electrode WS, and a drain electrode WD. The gate electrode WG is electrically connected to the scanning ling G. In the example illustrated, the electrode electrically connected to the signal line S is referred to as the source electrode WS, and the electrode electrically connected to the pixel electrode PE is referred to as the drain electrode WD. The scanning line G is connected to the switching elements SW of the respective pixels PX arranged in the first direction X. The signal line S is connected to the switching elements SW of the respective pixels PX arranged in the second direction Y.

The pixel electrode PE is electrically connected to the switching element SW. The common electrode CE is opposed to a plurality of pixel electrodes PE. The pixel electrode PE and the common electrode CE function as drive electrodes which drive the liquid crystal layer 13. The pixel electrode PE is formed of a transparent conductive material such as ITO or IZO, or a reflective metal material such as aluminum or silver. Further, the common electrode CE is formed of a transparent conductive material such as ITO or IZO. A storage capacitance CS is formed between, for example, the common electrode CE and the pixel electrode PE.

Although the details of the structure of the display panel 1 will not be described here, the display panel 1 has a structure corresponding to one of various modes including a twisted nematic (TN) mode, a polymer dispersed liquid crystal (PDLC) mode, an optically compensated bend (OCB) mode, an electrically controlled birefringence (ECB) mode, a vertically aligned (VA) mode, a fringe field switching (FFS) mode, and in-plane switching (IPS) mode. Also, while explanation has been provided for a case where each of the pixels PX is driven by an active method, the pixels PX may be driven by a passive method.

FIG. 23 is a cross-sectional view showing a configuration example of the display panel 1 shown in FIG. 22. Here, a cross-sectional structure of the display panel 1 adopting a fringe field switching (FFS) mode, which is one of display modes using a lateral electric field, will be explained briefly. In the example illustrated, the display panel 1 includes a red pixel PXR which displays red, a green pixel PXG which displays green, and a blue pixel PXB which displays blue, in the display area DA. However, the display panel 1 may include a pixel which displays the other color. For example, from the standpoint of improving the transmissivity of the display panel 1, the display panel 1 should preferably include a pixel which displays white or a transparent pixel.

The array substrate 11 includes a first insulating substrate 100, a first insulating film 110, the common electrode CE, a second insulating film 120, pixel electrodes PE1 to PE3, a first alignment film AL1, and the like. The common electrode CE extends over the red pixel PXR, the green pixel PXG, and the blue pixel PXB. Each of the pixel electrode PE1 of the red pixel PXR, the pixel electrode PE2 of the green pixel PXG, and the pixel electrode PE3 of the blue pixel PXB is opposed to the common electrode CE, and includes slits SLA. In the example illustrated, the common electrode CE is located between the first insulating film 110 and the second insulating film 120, and the pixel electrodes PE1 to PE3 are located between the second insulating film 120 and the first alignment film AL1. Alternatively, the pixel electrodes PE1 to PE3 may be located between the first insulating film 110 and the second insulating film 120, and the common electrode CE may be located between the second insulating film 120 and the first alignment film AL1. In this case, the slits SLA are formed in the common electrode CE.

The counter-substrate 12 includes a second insulating substrate 200, a light-shielding layer BM, color filters CFR, CFG, and CFB, an overcoat layer OC, a second alignment film AL2, and the like. The color filters CFR, CFG, and CFB are opposed to the pixel electrodes PE1 to PE3, respectively, with the liquid crystal layer 13 interposed therebetween. The color filter CFR is a red color filter, the color filter CFG is a green color filter, and the color filter CFB is a blue color filter.

Note that, although color filters CFR, CFG, and CFB are formed in the counter-substrate 12 in the example illustrated, they may be formed in the array substrate 11 instead. Although the light-shielding layer BM is located between adjacent color filters, it may be omitted in terms of improving the transmissivity of the display panel 1. If color display is unnecessary, color filters are omitted.

The liquid crystal layer 13 is sealed between the first alignment film AL1 and the second alignment film AL2. Each of the first alignment film AL1 and the second alignment film AL2 is a horizontal alignment film.

In an off-state in which no electric field is produced between the pixel electrode PE and the common electrode CE, the liquid crystal molecules LM included in the liquid crystal layer 13 are initially aligned in a direction substantially parallel to the X-Y plane by an alignment restriction force of the first alignment film AL1 and the second alignment film AL2. In an on-state in which an electric field is produced between the pixel electrode PE and the common electrode CE, the liquid crystal molecules LM are aligned in a direction different from the initial alignment direction, in the X-Y plane.

According to the display device DSP of the first example described above, while a position of the light-shielding body 4 does not change, a position of the lens 5 can be changed freely. By selectively changing a relative positional relationship between the light-shielding body 4 and the lens 5, the emitting direction of light emitted from the display device DSP can be controlled. In other words, a viewing angle can be freely controlled for an observer who observes the display device DSP. For example, switching can be conducted between a narrow-viewing-angle mode of a first angular range and a wide-viewing-angle mode of a second angular range which is greater than the first angular range. Also, it is possible to switch between a first viewing angle mode including an observation angle that enables observation mainly in a normal direction of the display device DSP and a second viewing angle mode including an observation angle that enables observation in a direction inclined with respect to the normal of the display device DSP.

FIG. 24 is an illustration for explaining an example of the positional relationship between a pixel opening OP of the display panel 1 and the lens 5. Here, the pixel opening OP corresponds to a region which can transmit light in each of the red pixel PXR, the green pixel PXG, and the blue pixel PXB explained with reference to FIG. 23, or a region surrounded by the light-shielding layers BM.

In one example, pitch P5 between the lenses 5 is less than or equal to pitch POP between the pixel openings OP. Thereby, light beams refracted by the lenses 5 are guided to the pixel openings OP, respectively. Light beams transmitted through the corresponding pixel openings OP are oriented in a certain direction, and observed at the same observation position. For example, as compared to a case where a light beam transmitted through a first pixel opening is observed at a first observation position, and a light beam transmitted through a second pixel opening is observed at a second observation position that is different from the first observation position, when both of the light beams transmitted through the first pixel opening and the second pixel opening are observed at the first observation position, deterioration in the resolution can be suppressed.

Also, since a focusing position 5P of the lens 5 as illustrated in the drawing is located in the pixel opening OP, efficiency of use of light can be improved, and thus, the brightness can be improved.

FIG. 25 is an illustration showing a second example of the display device DSP. More specifically, the display device DSP comprises the display panel 1, the light source unit 3, the liquid crystal element 40 which can form the light-shielding body 4, and the lens 5. In the example illustrated, while the lens 5 is provided between the display panel 1 and the liquid crystal element 40, it may be provided at any place between the display panel 1 and the light source unit 3. The structures of the display panel 1 and the liquid crystal element 40 are described above, and explanation of these structures is omitted.

According to the display device DSP of the second example described above, while a position of the lens 5 does not change, a position of the light-shielding body 4 can be changed freely. By selectively changing a relative positional relationship between the light-shielding body 4 and the lens 5, the same advantage as that of the first example can be obtained.

FIG. 26 is an illustration showing a third example of the display device DSP. More specifically, the display device DSP comprises the display panel 1, the light source unit 3, the liquid crystal element 40 which can form the light-shielding body 4, and the liquid crystal element 50 which can form the lens 5. In the example illustrated, while the liquid crystal element 50 is provided between the display panel 1 and the liquid crystal element 40, it may be provided between the light source unit 3 and the liquid crystal element 40. The structures of the display panel 1, the liquid crystal element 40, and the liquid crystal element 50 are described above, and explanation of these structures is omitted.

According to the display device DSP of the third example described above, while a position of the lens 5 does not change, a position of the light-shielding body 4 can be changed freely. By selectively changing a relative positional relationship between the light-shielding body 4 and the lens 5, the same advantage as that of the first example can be obtained. In addition, by changing the arrangement position of the light-shielding body 4 and the lens 5 according to the position of the observer, the emitting direction of light can be reoriented in accordance with the observation position of a moving observer (i.e., to follow the observer). Also, the light-shielding body 4 can be used as a parallax barrier, and by a combination of the light-shielding body 4 and the lens 5, switching can be conducted between a two-dimensional image display mode and a three-dimensional image display mode.

FIG. 27 is an illustration showing a fourth example of the display device DSP. More specifically, the display device DSP comprises the display panel 1, the light source unit 3, the liquid crystal element 40*a* which can form the light-shielding body 4*a*, and the liquid crystal element 40*b* which can form the light-shielding body 4*b*. The structures of the liquid crystal elements 40*a* and 40*b* are the same as the structure of the liquid crystal element 40. The light-shielding body 4*a* corresponds to a first light control body which controls an output angle of light emitted from the light source unit 3. The light-shielding body 4*b* corresponds to a second light control body which controls an output angle of light emitted from the liquid crystal element 40*a*.

In the fourth example, a liquid crystal element which can form the lens is not provided. However, as the light-shielding bodies 4*a* and 4*b* which control the output angle are arranged along the third direction Z, the emitting direction can be controlled, and the same advantage as that of the first example can be obtained. As described above, according to the present embodiment, it is possible to provide a display device and an illumination device capable of controlling a direction of emission of light.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:

a display panel; and an illumination device which illuminates the display panel, wherein the illumination device comprises a light source unit which emits light toward the display panel, at least one light-shielding body which is located between the light source unit and the display panel, and blocks part of the light emitted from the light source unit, at least one lens which is located between the light source unit and the display panel, and refracts the light emitted from the light source unit, and an illumination controller, and the illumination controller controls a first mode in which the light-shielding body is arranged at a first position, and a second mode in which the light-shielding body is arranged at a second position different from the first position.

2. The display device of claim 1, further comprising a first liquid crystal element comprising the lens, wherein the first liquid crystal element comprises a first substrate comprising a plurality of first control electrodes, a second substrate comprising a second control electrode, and a first liquid crystal layer held between the first substrate and the second substrate, and the illumination controller controls a voltage to be applied to the first liquid crystal layer to form the lens in the first liquid crystal layer.

3. The display device of claim 2, wherein the illumination controller applies a first voltage for forming the lens at the first position in the first mode, and applies a second voltage for forming the lens at the second position in the second mode.

4. The display device of claim 2, wherein:

the first liquid crystal element comprises the lenses arranged in a first direction, each of the lenses extends in a second direction intersecting the first direction, and the light-shielding body extends in the second direction.

5. The display device of claim 1, further comprising a second liquid crystal element configured to form the light-shielding body, wherein the second liquid crystal element comprises a third substrate including a third outer surface, a plurality of third control electrodes provided in the third substrate, a fourth substrate including a fourth outer surface, a fourth control electrode provided in the fourth substrate, a second liquid crystal layer held between the third substrate and the fourth substrate, a first polarizer arranged on the third outer surface, and a second polarizer arranged on the fourth outer surface, and the illumination controller controls a voltage to be applied to the second liquid crystal layer to form the light-shielding body in the second liquid crystal layer.

6. The display device of claim 5, wherein the illumination controller controls a third voltage for forming the light-shielding body at the first position in the first mode, and a fourth voltage for forming the light-shielding body at the second position in the second mode.

7. The display device of claim 5, wherein:

the second liquid crystal element comprises the light-shielding bodies arranged in a first direction;

each of the light-shielding bodies extends in a second direction intersecting the first direction; and the lens extends in the second direction.

8. The display device of claim 5, wherein the lens is fixed at the first position.

9. The display device of claim 2, wherein:

the lens is a first lens having a first width in a first direction or a second lens having a second width, which is different from the first width, in the first direction; and the illumination controller controls a first voltage for forming the first lens, and a second voltage for forming the second lens.

10. The display device of claim 2, wherein:

the lens is a first lens having a symmetrical shape with respect to a normal of the first substrate, or a second lens having an unsymmetrical shape with respect to the normal; and the illumination controller controls a first voltage for forming the first lens, and a second voltage for forming the second lens.

11. The display device of claim 5, wherein:

the light-shielding body is a first light-shielding body having a third width in a first direction or a second light-shielding body having a fourth width, which is different from the third width, in the first direction; and the illumination controller controls a third voltage for forming the first light-shielding body, and a fourth voltage for forming the second light-shielding body.

12. An illumination device comprising:

a light source unit which emits light;

a light-shielding body which blocks part of the light emitted from the light source unit;

a first liquid crystal element comprising a lens which refracts the light emitted from the light source unit; and an illumination controller which controls a first mode in which the light-shielding body is arranged at a first position, and a second mode in which the light-shielding body is arranged at a second position different from the first position, wherein the first liquid crystal element comprises a first substrate comprising a plurality of first control electrodes, a second substrate comprising a second control electrode, and a first liquid crystal layer held between the first substrate and the second substrate, and the illumination controller controls a voltage to be applied to the first liquid crystal layer to form the lens in the first liquid crystal layer.

13. The illumination device of claim 12, further comprising a second liquid crystal element configured to form the light-shielding body, wherein the second liquid crystal element comprises a third substrate including a third outer surface, a plurality of third control electrodes provided in the third substrate, a fourth substrate including a fourth outer surface, a fourth control electrode provided in the fourth substrate, a second liquid crystal layer held between the third substrate and the fourth substrate, a first polarizer arranged on the third outer surface, and a second polarizer arranged on the fourth outer surface, and the illumination controller controls a voltage to be applied to the second liquid crystal layer to form the light-shielding body in the second liquid crystal layer.

14. An illumination device comprising:

a light source unit which emits light;

a first liquid crystal element configured to form a first light control body which controls an output angle of light emitted from the light source unit;

a second liquid crystal element configured to form a second light control body which controls an output angle of the light controlled by the first light control body; and an illumination controller which controls a first mode in which the first light control body and the second light control body are arranged at a first position, and a second mode in which at least one of the first light control body and the second light control body is arranged at a second position, which is different from the first position, wherein the first liquid crystal element comprises a first substrate, a plurality of first control electrodes provided in the first substrate, a second substrate, a second control electrode provided in the second substrate, and a first liquid crystal layer held between the first substrate and the second substrate, the illumination controller controls a voltage to be applied to the first liquid crystal layer to form the first light control body in the first liquid crystal layer, the second liquid crystal element comprises a third substrate including a third outer surface, a plurality of third control electrodes provided in the third substrate, a fourth substrate including a fourth outer surface, a fourth control electrode provided in the fourth substrate, a second liquid crystal layer held between the third substrate and the fourth substrate, a first polarizer arranged on the third outer surface, and a second polarizer arranged on the fourth outer surface, and the illumination controller controls a voltage to be applied to the second liquid crystal layer to form the second light control body in the second liquid crystal layer.

* * * * *